(12) United States Patent
Sevindik

(10) Patent No.: US 12,120,705 B2
(45) Date of Patent: *Oct. 15, 2024

(54) METHODS AND APPARATUS FOR MANAGING UPLINK RESOURCE GRANTS IN WIRELESS NETWORKS

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,846

(22) Filed: Sep. 11, 2023

(65) Prior Publication Data

US 2023/0422262 A1   Dec. 28, 2023

Related U.S. Application Data

(63) Continuation of application No. 17/849,665, filed on Jun. 26, 2022, now Pat. No. 11,770,838, which is a continuation of application No. 17/115,790, filed on Dec. 8, 2020, now Pat. No. 11,452,131.

(51) Int. Cl.
| | |
|---|---|
| *H04W 4/00* | (2018.01) |
| *H04W 16/14* | (2009.01) |
| *H04W 72/0446* | (2023.01) |
| *H04W 72/23* | (2023.01) |
| *H04W 72/53* | (2023.01) |

(52) U.S. Cl.
CPC ........... *H04W 72/23* (2023.01); *H04W 16/14* (2013.01); *H04W 72/0446* (2013.01); *H04W 72/53* (2023.01)

(58) Field of Classification Search
CPC ..... H04W 72/23; H04W 72/53; H04W 16/14; H04W 72/0446
See application file for complete search history.

(56) References Cited

U.S. PATENT DOCUMENTS

| | | | | |
|---|---|---|---|---|
| 10,813,103 | B1* | 10/2020 | Sevindik | H04W 48/20 |
| 2019/0045397 | A1* | 2/2019 | Mueck | H04W 72/53 |
| 2019/0058999 | A1* | 2/2019 | Gunasekara | H04W 36/22 |
| 2019/0115950 | A1* | 4/2019 | Kakinada | H04W 76/15 |
| 2019/0150134 | A1* | 5/2019 | Kakinada | H04W 16/14 |
| | | | | 370/330 |

(Continued)

*Primary Examiner* — Abdelnabi O Musa
(74) *Attorney, Agent, or Firm* — Straub & Straub; Stephen T. Straub; Michael P. Straub

(57) ABSTRACT

The present invention relates to methods and apparatus for managing uplink resource grants in wireless networks. An exemplary method embodiment includes the steps of: communicating resource grants to individual customer premise equipment (CPE) devices, the resource grants including at least a first resource grant to a first CPE device and a second resource grant to a second CPE device, the first resource grant giving the first CPE device the right to use a first set of resource blocks on a recurring basis, said second resource grant giving the second CPE device the right to use a second set of resource blocks on a recurring basis; monitoring the use of resource blocks granted to the first and second CPE devices during a first period of time; using stored resource utilization information to determine resource grants which are to be shared by the first and second CPE device.

20 Claims, 18 Drawing Sheets

(56) References Cited

U.S. PATENT DOCUMENTS

| | | | | |
|---|---|---|---|---|
| 2019/0159193 | A1* | 5/2019 | Zhang | H04L 5/0048 |
| 2019/0223025 | A1* | 7/2019 | Kakinada | H04W 72/0453 |
| 2019/0364565 | A1* | 11/2019 | Hmimy | H04W 36/06 |
| 2020/0083986 | A1* | 3/2020 | Zhang | H04J 13/0074 |
| 2020/0187098 | A1* | 6/2020 | Dhillon | H04W 16/16 |
| 2020/0329523 | A1* | 10/2020 | Yi | H04W 72/51 |
| 2021/0153092 | A1* | 5/2021 | Sevindik | H04W 64/003 |
| 2021/0204169 | A1* | 7/2021 | Sevindik | H04W 40/12 |

\* cited by examiner

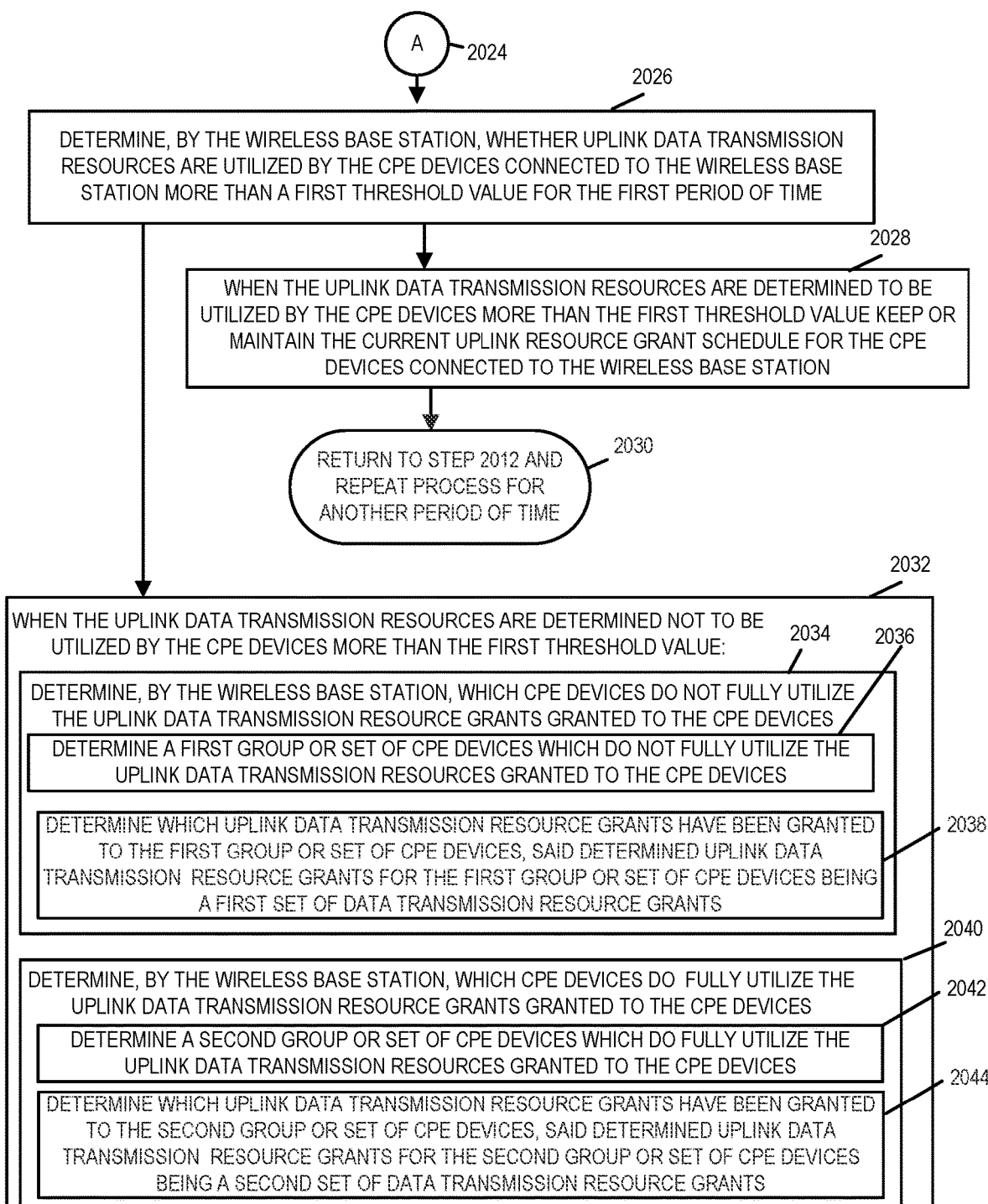

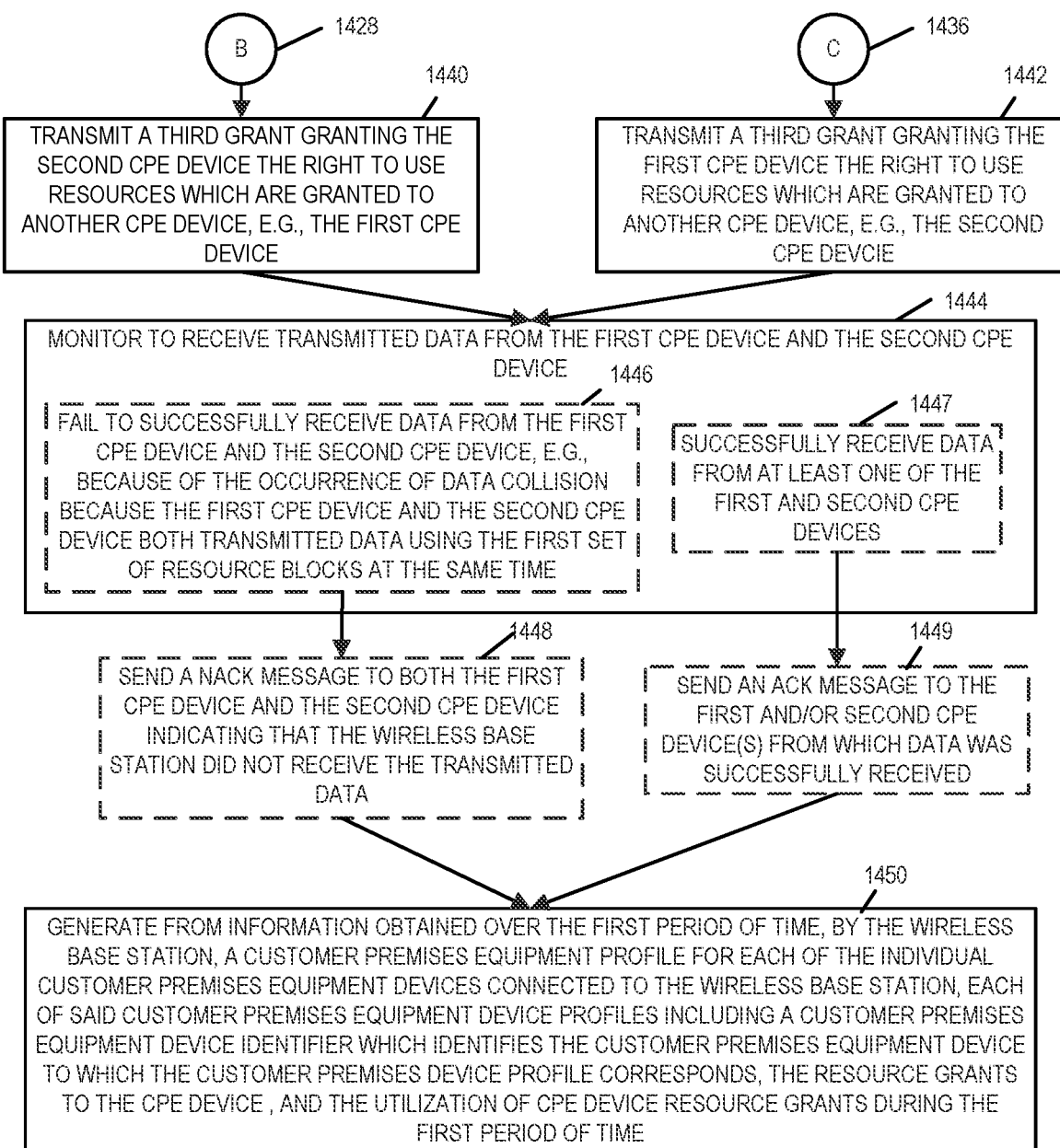

METHODS AND APPARATUS FOR MANAGING UPLINK RESOURCE GRANTS IN WIRELESS NETWORKS

RELATED APPLICATIONS

The present application is a continuation of U.S. patent application Ser. No. 17/849,665 which was filed on Jun. 26, 2022 and published as U.S. Patent Application Publication Number: US 2022-0338243 A1 on Oct. 20, 2022 which is a continuation of U.S. patent application Ser. No. 17/115,790 which was filed on Dec. 8, 2020 and issued as U.S. Pat. No. 11,452,131 on Sep. 20, 2022. Each of the foregoing patent applications, publications and patents are hereby expressly incorporated by reference in their entirety.

FIELD OF INVENTION

The present invention relates to methods and apparatus for managing uplink resource grants, e.g., uplink data transmission grants, in wireless networks. More particularly, the present invention relates to methods and apparatus for managing and/or scheduling uplink data transmission grants by wireless base stations for wireless devices, e.g., customer premises equipment devices and/or user equipment devices. The present invention further relates to methods and apparatus for uplink resource grant management in new radio 5G Fixed Citizens Broadband Radio Service (CBRS) Wireless Networks.

BACKGROUND OF THE INVENTION

In instances where wireless networks are being used to provide broadband services to a customer premises, the capacity of the wireless connection or link to the customer premises may not be the limiting factor but instead congestion on links, connections or communications paths within the customer premises may become a bottleneck for providing services. For example, such problems occur in Citizens Broadband Radio Service networks.

In a Citizens Broadband Radio Service (CBRS) network, Citizens Broadband Radio Service Devices (CBSDs) serve as access points which can support wireless communications with user equipment devices (UEs).

A CBRS network includes a plurality of CBSD devices. The CBSD devices provide wireless services to subscribers' user equipment devices. Spectrum is granted to each of the CBSDs using a centralized system called the Spectrum Access System (SAS). The Spectrum Access System is a central processing and database system that receives and processes spectrum grant requests. In the CBRS network, interference is managed through power management of CBSD devices by the Spectrum Access System (SAS). The SAS stores information regarding which CBSD uses how much spectrum at which location in the CBRS network.

Many customer premises, e.g., homes do not have landline connections or landline connections which can support broadband services. For example, in various geographical areas, e.g., rural areas of the country with sparse populations, it is not economical or practical to connect landlines to all customer premises. In such areas, there is a need for providing services, e.g., broadband services, to the customer premises which do not have landline connections or do not have landline connections which can provide broadband services. Additionally, in urban areas where landline connections can provide broadband services customers may still desire to have services provided via wireless connections in place of or in addition to landline connections. For example, universities, businesses, hospitals, hotels, etc. may desire to provide broadband or other types of wireless services throughout their customer premises and/or buildings using Wi-FI wireless connections through which users can connect therein being in a position to manage the wireless services provided.

In some CBRS systems the wireless services are provided to a plurality of devices at the customer premises, e.g., user equipment devices, using a customer premise equipment device that provides WI-FI services at the customer premises, the customer premises equipment devices then communicating to a wireless base station, e.g., CBSD. The customer premises equipment devices are located at fixed network locations and attached to or include antennas. The antennas are typically mounted at an elevated fixed location such as on the top of a building or attached to pole on the customer premises so as to avoid obstacles that may inhibit the ability of the customer premises equipment device to be able to communicate with its wireless base station, e.g., CBSD device.

In the new radio 5G standard, uplink (UL) resources, e.g., resource blocks, are assigned to user equipment devices at fixed intervals and this is referred to as "proactive grants". In fixed wireless access networks, a user terminal is a customer premises equipment (CPE) device which acts the same as user equipment device, e.g., mobile phone, does. The new radio 5G base station, e.g., a CBSD in a CBRS fixed wireless network, assigns uplink resources periodically to each CPE device which is attached or connected to it. If a CPE device connected to the wireless base station does not have data to send in the uplink, the CPE device skips this data transmission opportunity. While the use of "pro-active grants" might work well for regular non-fixed wireless access networks in which each device connected to a wireless base station typically transmits uplink data to the wireless base station for a single user, however since CPE devices typically transmits 6-8 Wi-Fi user's traffic in the uplink, skipping a data transmission opportunity or leaving those resource blocks unfilled wastes uplink resources.

From the above it should be appreciated that there is a need for new and/or improved methods and apparatus for managing uplink resources in wireless networks. There is a further need for new and/or improved methods of managing uplink resources by wireless base stations which provide wireless services, e.g., wireless broadband services, to customer premises equipment devices such as those serving a plurality of devices at a customer premises in fixed wireless access networks, e.g., new radio 5G/CBRS fixed wireless access networks. There is a further need for new and/or improved methods and apparatus for increasing the utilization of uplink resources in wireless networks which use proactive uplink resource grants. Additionally, there is a need for new and/or improved methods and apparatus for more effectively and efficiently managing uplink resource grants for data transmission of user terminals, e.g., customer premise equipment devices which are responsible for providing uplink services to a plurality of users. In wireless systems, e.g., 5G and CBRS wireless networks, wherein the frequency spectrum and power level of transmission are controlled by a spectrum management entity such as for example a spectrum access system to minimize interference and maximize frequency spectrum usage/efficiency, there is a need for new and/or improved methods and apparatus to solve the technological problem of how to efficiently manage uplink data transmission grants for customer premises equipment devices from fixed locations. There is also a need for new and/or improved methods and apparatus to solve the technological problem of how to prioritize by a wireless base station uplink resource grants to the different types of wireless devices being supported by the wireless base station. There is a further need for new and/or improved methods and apparatus that take into account a device's properties, attributes and/or past uplink resource usage history when determining and/or managing uplink resource grants for a device.

SUMMARY OF THE INVENTION

The present invention provides a technological solution of how to efficiently manage uplink resources in a wireless network. The present invention provides technological solutions that increase and/or improve the uplink resource utilization in wireless networks. The present invention further provides a technological solution of how a wireless base station can take into account various attributes, characteristics, proprieties and/or historical uplink resource utilization of one or more devices, e.g., CPE devices to which the wireless base station is providing wireless services in a wireless network, e.g., a fixed wireless access network. Various embodiments of the present invention include novel methods and apparatus to solve one or more of the problems identified above.

By using one or more of the techniques described herein a wireless base station can manage the uplink resource grants to wireless devices, e.g., customer premises equipment devices and user equipment devices, attached/connected to the wireless base station. The customer premises equipment devices being devices located at a fixed position at a customer's premises which provides services for one or more user equipment devices, e.g., via a Wi-Fi network at the customer premises at which the customer premises equipment device is located. The present invention also provides new and/or improved techniques for uplink resource grant scheduling and implementation for customer premises equipment devices in fixed wireless access networks.

An exemplary method embodiment in accordance with the present invention includes operating a wireless base station to perform the following steps: communicating resource grants to individual customer premise equipment (CPE) devices, said resource grants including at least a first resource grant to a first CPE device and a second resource grant to a second CPE device, the first resource grant giving the first CPE device the right to use a first set of resource blocks on a recurring basis, said second resource grant giving the second CPE device the right to use a second set of resource blocks on a recurring basis; monitoring the use of resource blocks granted to the first and second CPE devices during a first period of time; storing first resource utilization information about the utilization of said first set of resource blocks by said first CPE device; and storing second resource utilization information about the utilization of the second set of resource blocks by said second CPE device. In various embodiments, the resource grants to individual customer premise equipment (CPE) devices are uplink data transmission resource grants.

In some embodiments, the first set of resource blocks includes one or more resource blocks; and the second set of resource blocks includes one or more resource blocks which are different from the resource blocks in said first set of resource blocks.

In some embodiments, the first resource utilization information indicates whether resource blocks granted to the first CPE device were used during the first period of time.

In some embodiments, the first resource utilization information indicates, when the resource blocks granted to the first CPE device were used during the first period of time, a portion or amount of the first set of resource blocks that were used during the first period of time (e.g., whether they were fully used or only a portion was used to transmit data—this information can be indicated as a utilization portion with a 1 indicating full utilization or a fraction indicating less than full utilization). In some embodiments, the second resource utilization information indicates whether resource blocks granted to the second CPE device were used during the first period of time. In some embodiments, the second resource utilization information indicates, when the resource blocks granted to the second CPE device were used during the first period of time, a portion or an amount of the first set of resource blocks that were used during the first period of time (e.g., whether they were fully used or only a portion was used to transmit data—this information can be indicated as a utilization portion with a 1 indicating full utilization or a fraction indicating less than full utilization).

In most embodiments, the method further includes operation the wireless base station to perform the additional the steps of making a resource sharing decision based on the stored first and second resource utilization information; and transmitting a third grant granting the second CPE device the right to use resources which are granted to another CPE device. In some embodiments, the third grant grants resources which are shared as part of said resource sharing decision based on no or low use of resources granted in said third grant during said first period of time. In some such embodiments, said low use of resources granted in said third grant during said first period of time includes the utilization of the resources in the third grant being less than a first threshold value.

In some embodiments the step of making said resource sharing decision based on the stored first and second resource utilization information includes determining which CPE devices utilized the full amount of resources granted to the CPE device during the first period of time.

In some embodiments, the resource sharing decision further includes determining whether the first CPE device used greater than a first threshold value of the resources granted to the first CPE device during the first period of time and determining whether the second CPE device used greater than a first threshold value of the resources granted to the second CPE device during the first period of time. In some such embodiments, when said first CPE device is determined to not have used greater than a first threshold value of the resources granted to the first CPE device during the first period of time and the second CPE device is determined to have used greater than the first threshold value of the resources granted to the second CPE device during the first period of time the resource sharing decision is includes determining to share the resources granted to the first CPE device with the second CPE device. In such embodiments, the another CPE device is the first CPE device. Furthermore, in some such embodiments, the wireless base station prior to making the resource sharing decision determines that the second CPE device fully utilized the resources granted to the second CPE device during the first period of time.

In some method embodiments, the resource sharing decision is based on statistical analysis of usage of the first and second resource grants by the first CPE device and second CPE device.

In various embodiments, the step of communicating resource grants to individual customer premise equipment (CPE) devices includes: sending downlink control information including said resource grant information to the individual CPE devices using a Physical Downlink Control Channel.

In some embodiments, the step of making a resource sharing decision based on the stored first and second resource utilization information includes: making a statistical determination based on said stored first and second resource utilization information.

In some method embodiments, the third resource grant includes granting the second CPE device the right to use said first set of resource blocks on a recurring basis during a second period of time. In such embodiments, the first CPE device and said second CPE device both have the right to use the first set of resource blocks during the second period of time and the second CPE device also continues to have the right to use the second set of resource blocks during the second period of time.

In some embodiments, the second CPE device does not utilize every recurrence of the first set of resource blocks to transmit data and the second CPE device determines which recurrences of the first set of resources blocks to use for transmitting data based on a randomly generated probability value or a prior receipt of a NACK message in response to a transmission of data using the first set of resource blocks.

In some embodiments, when a data collision occurs because the first CPE device and the second CPE device both transmit data using the first set of resource blocks at the same time, the wireless base station sends a NACK message to both the first CPE device and the second CPE device indicating that the wireless base station did not receive the transmitted data and in response to receiving by the second CPE device receives said NACK message, the second CPE device decreases the number of recurrences it attempts to transmit data using the first set of resource blocks.

In some embodiments, when the second CPE device receives an ACK message in response to data transmitted to the wireless base station using the first set of resource blocks, the second CPE device increases the frequency with which it transmits data to the wireless base station using the first set of resource blocks until it receives a NACK message in response to data transmitted to the wireless base station using the first set of resources blocks after which decreases the frequency with which it transmits data to the wireless base using the first set of resource blocks.

In some embodiments, the second CPE device monitors the ACK and NACK messages received from the wireless base station in response to data transmission attempts using the first set of resource blocks and adjusts the frequency of data transmission attempts using the first set of resource blocks to minimize collisions with data transmission from the first CPE device using the first set of resource blocks.

In various embodiments, the wireless base station is a Citizens Broadband Radio Service Device; and the customer premises equipment devices are Citizens Broadband Radio Service customer premises equipment devices. The individual customer premises equipment devices provide services to one or more user equipment devices via Wi-Fi connections.

In some embodiments, the wireless base station is further operated to generate from information obtained over the first period of time, by the wireless base station, a customer premises equipment device profile for each of the individual customer premises equipment devices connected to the wireless base station, each of said customer premises equipment device profiles including a customer premises equipment device identifier which identifies the customer premises equipment device to which the customer premises equipment device profile corresponds, the resource grants to the CPE device, and the utilization of the CPE device resource grants during the first period of time.

The present invention is also applicable to and includes apparatus and systems such as for example, apparatus and systems that implement one or more of the steps of the method embodiments. An exemplary communications system in accordance with the present invention includes a wireless base station including: memory; and a processor included in the wireless base station which controls the operation of the wireless base station to perform the following operations: (i) communicating resource grants to individual customer premise equipment (CPE) devices, said resource grants including at least a first resource grant to a first CPE device and a second resource grant to a second CPE device, the first resource grant giving the first CPE device the right to use a first set of resource blocks on a recurring basis, said second resource grant giving the second CPE device the right to use a second set of resource blocks on a recurring basis; (ii) monitoring the use of resource blocks granted to the first and second CPE devices during a first period of time; (iii) storing first resource utilization information about the utilization of said first set of resource blocks by said first CPE device in said memory; and (iv) storing second resource utilization information about the utilization of the second set of resource blocks by said second CPE device in said memory. In various embodiments, the resource grants to individual customer premise equipment (CPE) devices are uplink data transmission resource grants.

In various embodiments, the first set of resource blocks includes one or more resource blocks; and the second set of resource blocks includes one or more resource blocks which are different from the resource blocks in said first set of resource blocks. In some wireless communications system embodiments, the first resource utilization information indicates whether resource blocks granted to the first CPE device were used during the first period of time. In some wireless communications system embodiments, the first resource utilization information indicates, when the resource blocks granted to the first CPE device were used during the first period of time, a portion or amount of the first set of resource blocks that were used during the first period of time (e.g., whether they were fully used or only a portion was used to transmit data—this information can be indicated as a utilization portion with a 1 indicating full utilization or a fraction indicating less than full utilization). In some such embodiments, the second resource utilization information indicates whether resource blocks granted to the second CPE device were used during the first period of time. In some embodiments, second resource utilization information indicates, when the resource blocks granted to the second CPE device were used during the first period of time, a portion or an amount of the first set of resource blocks that were used during the first period of time (e.g., whether they were fully used or only a portion was used to transmit data—this information can be indicated as a utilization portion with a 1 indicating full utilization or a fraction indicating less than full utilization).

In various wireless communications system embodiments, the processor further controls the wireless base station to perform the following operations: making a resource sharing decision based on the stored first and second resource utilization information; and transmitting a third grant granting the second CPE device the right to use resources which are granted to another CPE device. In some embodiments, the third grant grants resources which are shared as part of said resource sharing decision based on no or low use of resources granted in said third grant during said first period of time. In some such embodiments, the low use of resources granted in said third grant during said first period of time includes the utilization of the resources in the third grant being less than a first threshold value.

In some embodiments, the operation of making said resource sharing decision based on the stored first and second resource utilization information includes determining which CPE devices utilized the full amount of resources granted to the CPE device during the first period of time.

In some embodiments, the customer premises equipment devices provide services to one or more user equipment devices via Wi-Fi connections.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 2 illustrates the combination of FIGS. 2A, 2B, and 2C.

FIG. 2B illustrates the steps of the second part of an exemplary method in accordance with one embodiment of the present invention.

FIG. 14 illustrates the combination of FIGS. 14A, 14B, and 14C.

FIG. 14C illustrates the steps of the third part of an exemplary method in accordance with an embodiment of the present invention.

DETAILED DESCRIPTION

Figure 1:
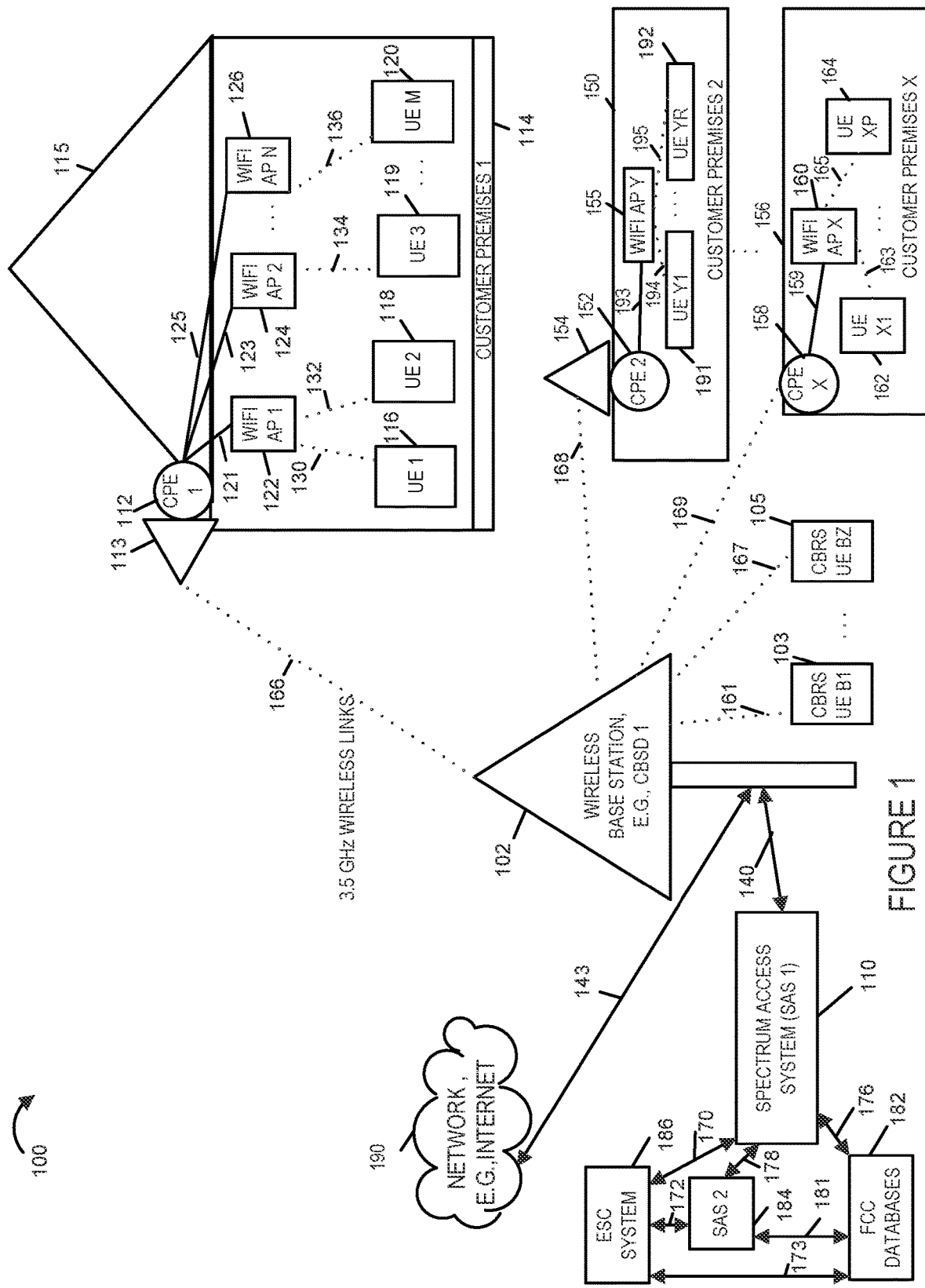
FIG. 1 illustrates an exemplary wireless communications system shown as a Citizens Broadband Radio Service network system 100 that provides wireless communications services in accordance with one embodiment of the present invention.

The current invention is applicable to wireless networks, e.g., new radio 5G wireless networks and Citizens Broadband Radio Service (CBRS) networks, that provide wireless communications services, e.g., broadband services to user equipment devices at customer premises. The present invention is particularly useful in fixed wireless access networks in which the network environment is a relatively controlled environment since the customer premises equipment devices are fixed at certain locations, i.e., at customer premises, in the network. The present invention provides new and/or improved methods and apparatus for managing uplink resource grants to customer premises equipment devices connected and/or attached to wireless base stations. Various embodiments of the present invention are directed to new apparatus and methods for managing uplink resource grants, e.g., proactive grants or assignments of resource blocks to use for uplink data transmission, by wireless base stations, to devices located at a customer premises. While the invention is explained using an exemplary Citizens Broadband Radio Service network, it should be understood that the invention is not limited to Citizens Broadband Radio Service networks.

In one exemplary method embodiment of the present invention, the method includes the steps of:
  (i) wireless base station, e.g., CBSD, registering with a resource management system, e.g., spectrum access system;
  (ii) CPE devices, e.g., CBRS CPE devices, connecting to the wireless base station with the wireless base station identifying the CPE devices as CPE devices based on a CPE device Identifier provided by the CPE device during connection to the wireless base station;
  (iii) the wireless base station determining UL data transmission grant for each CPE device in the network connected to the wireless base station, e.g., proactive grants which are fixed grants upon which the CPE device is granted the right to transmit its own uplink data at specified time intervals using the resource blocks assigned by the wireless base station in the grant;

(iv) each CPE device connected to the wireless base station determines whether it has uplink data to be sent at its granted time interval and when it has data starts data transmission in the uplink using the resource blocks in its assign grant at the specified time and each CPE device skips data transmission in the uplink when it determines it does not have data to transmit;

(v) the wireless base station monitors and records or stores in memory the number of uplink grants that are skipped the most, and by which CPE devices (e.g., CPE device 1 112 skips the most uplink data transmission opportunities);

(vi) the wireless base station checks or determines which CPE devices fills up the uplink resource blocks fully at each uplink transmission opportunity without skipping an opportunity (e.g., CPE device 2 152);

(vii) the wireless base station sends the uplink grant schedule of the CPE device which skips the most uplink transmission opportunities (e.g., CPE device 1) to the CPE device which fills up the uplink resource blocks fully at each UL transmission opportunity without skipping an opportunity (e.g., CPE device 2) and instructs the CPE device 2 to use CPE device 1's grants in a random order, that is CPE device 2 will not use CPE device 1's grants all the time assuming that CPE device 1 will never send data in the uplink to the wireless base station. The randomness will decrease the probability of a collision between the CPE device 1 and CPE device 2 use of the uplink channel. When CPE device 2 uses one of CPE device 1's assigned uplink grants, and receives an ACK signal from the wireless base station via the HARQ mechanism, the CPE device 2 will increase the number of uplink grants that CPE device 2 will use till CPE device 2 receives a NACK from the wireless base station. The ACK indicates a successful reception of a CPE device's data. If a CPE device 2 receives a NACK from the wireless base station, the CPE device 2 will decrease the number of used (borrowed) CPE device 1's uplink grants and will increase the level of randomness to select a particular CPE device 1's uplink grant to transmit its own uplink data. For instance, CPE device 2 can wait longer to borrow uplink grants from CPE device 1. Alternatively, CPE device 2 can generate its own statistics to decide when to send data. If CPE device 2's uplink data transmission in a particular CPE device 1 grant receives no NACK's then CPE device 2 might use this particular uplink grant all the time. This embodiment may be, and in some embodiments is, implemented using system 100 shown in FIG. 1 and described in detail below. Various additional embodiments of the present invention will be explained in further detail below.

Citizens Broadband Radio Service networks are networks that include user equipment devices, e.g., mobile or wireless devices such as for example cell phones, smart phones, laptops, tablets, smart TVs, Citizens Broadband Radio Service Devices (CBSDs) which serve as access points/base stations, and Spectrum Access Systems which provides spectrum assignments and manage frequency interference through power management of the CBSDs transmission power. The Citizens Broadband Radio Service network utilizes the 150 megahetz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area.

Various embodiments of the present invention describe methods, apparatus, systems and techniques for managing and/or utilizing uplink resource grants and/or assignments for user terminals, e.g., customer premises equipment devices, in wireless networks therein providing wireless services in an efficient and effective manner. In some embodiments of the present invention, Citizen Broadband Radio Service spectrum, 3.5 GHz frequency spectrum band, is used to serve nomadic and stationary users. In some embodiments, a CBSD base station is dedicated to serving only stationary users, while in other embodiments the CBSD serves both nomadic and stationary users. The invention is useful to provide broadband services to geographically isolated or remote areas, e.g., rural areas, where wired or optical connections are expensive and not economical given the number of customers to be serviced. The invention is also useful in urban areas where wireless services may be preferred as a replacement for wired connections or in addition to wired connections. In the present invention, a CBRS Customer Premise Equipment device (CPE) is located at a customer's premises inside of a house, business or any place where there are CBRS network users. The CBRS CPE device is coupled or connected to at least one CBRS fixed wireless access (FWA) tower base station (e.g., CBSD) over wireless communications links. The CBRS CPE is typically located in a building such as a home and is coupled to one or more antennas or an antenna array through which the CBRS CPE device transmits to and receives from the antenna(s) of the CBRS FWA tower base station (CBSD) wireless signals over the wireless communications link. These wireless communications links being in the 3.5 GHz frequency spectrum band. The CBRS CPE device in some embodiments includes external antennas. In some embodiments, the CBRS CPE device includes one or more internal antennas. In some embodiments, the CBRS CPE device includes one or more internal antennas and one or more antenna ports to which one or more external antennas are connected. The CBRS CPE device is coupled through a wired connection, e.g., a cable to one or more Wireless Fidelity (Wi-Fi) Access Points. The CBRS CPE device also referred to herein as CPE device or CPE serves the subscribers or users located in its coverage area, e.g., in the house, building, or on the customer's premises. The one or more Wi-Fi access points provide Wi-Fi services to the one or more end point devices or user equipment devices located at the customer premises. The one or more Wi-Fi access points are connected over a cable or wired communications to the CBRS CPE device through which backhaul is provided.

The wireless base station in the exemplary embodiment is a CBRS FWA tower base station which is a CBSD device and as such its transmission power levels and spectrum bandwidth are allocated or assigned to it via a Spectrum Access System of the CBRS network. The CBRS network includes multiple CBSD devices though only a single wireless base station, CBSD, is shown in the exemplary system 100 illustrated in FIG. 1.

Each wireless base station, e.g., CBRS FWA tower base station/CBSD, is coupled to and registered with a CBRS network Spectrum Access System (SAS) of the CBRS network. The CBRS network Spectrum Access System manages the allocation of CBRS network spectrum and transmission power levels. The SAS is responsible for assigning/allocating spectrum to the CBRS FWA tower base stations. The CBRS FWA tower base station manages the downlink and uplink resource assignments/grants to be utilized by the wireless devices, e.g., wireless terminal devices, e.g., CPE devices and user equipment devices, connected and/or attached to the wireless base station.

The CBRS CPE device antenna(s) are typically located at an elevated position such as for example on the top of a roof of a building or on a pole outside the building in which the CBRS CPE device is located. In some embodiments, the CBRS CPE device includes one or more internal antennas and/or one or more antenna ports for connecting the device via a wire to external antennas mounted outside of the building.

The transmission power levels allocated for the wireless base stations, e.g., CBRS FWA tower base stations/CBSDs, are high in comparison to the transmission power level of the CPE devices, e.g., CBRS CPE devices. For example, a CBRS FWA tower base station coverage area can include hundreds of customer premises while the CBRS CPE device has a much smaller coverage area. Each CBRS CPE located at a customer's premises provides services to subscriber's user equipment devices such as computers, laptops, tablets, smart devices (e.g., appliances, watches, smartTVs), streaming devices, WiFi devices, CBRS enabled devices (e.g., CBRS phones), via one or more Wi-Fi Access Points. The CPE device includes at least one wireless interface for communicating with wireless base station, e.g., CBRS FWA tower base station. The CPE device also includes one or more wired and/or optical interfaces so that it can be coupled to and communicate with WiFi access points or base stations and/or other devices with wired and/or optical interfaces such as internet telephony systems, cable network devices, internet media streaming devices, e.g., over wired or optical networks (e.g., local area networks or wide area networks) at the customer's premises. The CPE device provides bridging and/or protocol converter and/or router functionality as the CPE device converts wireless signals received in a first protocol format, e.g., 5G wireless signal, CBRS wireless signal or a cellular wireless signal, to a format that is understood by the Wi-Fi access points.

FIG. 1 illustrates an exemplary wireless communications system 100 illustrated as a CBRS network communications system, having an architecture implemented in accordance with an embodiment of the present invention and being coupled to a network 190 (e.g., the internet). The communications system 100 also referred to as the CBRS communications network system 100 includes at least one wireless base station 1 102 illustrated as a Citizens Broadband Radio Service Fixed Wireless Assess (FWA) tower base station (CBSD) (e.g., CBSD 1), a plurality of Spectrum Access System devices (SAS 1 110, SAS 2 184), a plurality of customer premises (customer premises 1 114, customer premises 2 150, . . . , customer premises X 156, X being an integer greater than 2), a plurality of CBRS Customer Premises Equipment devices (CBRS CPE device 1 112, CBRS CPE device 2 152, . . . , CBRS CPE device X 158, X being integer greater than 2), a plurality of Wi-Fi Access Points or base stations (Wi-Fi AP 1 122, Wi-Fi AP 2 124, . . . , Wi-Fi AP N 126, Wi-Fi AP Y 155, Wi-Fi AP X 160) an ESC system 186, a FCC Database System 182, and a plurality of communications links 121, 123, . . . , 125, 130, 132, 134, . . . , 136, 140, 143, 159, 163, 165, 166, 168, 169, 170, 172, 173, 176, 178, and 181. The CBRS system 100 is coupled to a network 190, e.g., the Internet, through which various services can be provided such as for example voice over internet call services, video on demand services, video conferencing services. In some embodiments, the network is a part of the 5G/CBRS network and the services are provided from CBRS network service providers. In the example system shown in FIG. 1 the wireless base station 102, e.g., CBRS FWA tower base station 1 or CBSD 1 is illustrated as being coupled or connected to the network 190 via communications link 143 which may be a wired, wireless or an optical link. Though not shown the CBRS network typically includes other wireless base stations, e.g., CBRS tower base stations or CBSDs, which are also typically coupled or connected to the network 190 via communications links. In some embodiments, the wireless base stations, e.g., CBRS tower base stations or CBSDs, are coupled to a packet gateway system which is part of and located in the network 190.

CPE device 1 (CPE 1) 112, e.g., CBRS CPE device, includes an antenna system 113, e.g., one or more antenna or an antenna array mounted on a roof of a building 115, e.g., home or office building, located in customer premises 1 114 for communicating with the wireless base station 102, e.g., CBRS tower base station 1 102. The antenna being coupled to a portion of the CPE device 1 which is located inside the house 115 and which also includes separate interfaces for communicating with Wi-Fi Access Points located at the customer premises or within its coverage range. Wi-Fi Access Points 122, 124, and 126 are coupled to or connected to the CPE device 1 112 via wires or cables 121, 123, and 125 respectively in the exemplary embodiment.

CPE device 2 (CPE 2) 152, e.g., CBRS CPE device 2, is located at the customer premises 2 150 and includes an antenna system 154 located at an elevated position (e.g., mounted on a pole or roof of a building located at the customer premises 2 150) for communicating with the wireless base stations e.g., wireless base station 102, e.g., CBRS tower base station 1 102. The elevation of the antenna system allows for less obstruction of wireless signals do to other structures and hence provides for a larger geographical area within which it can exchange wireless signals with wireless base stations, e.g., CBRS tower base stations. CPE 2 152 also includes a separate interface for communicating with a Wi-Fi Access Point located at the customer premises or within its coverage range. Wi-Fi Access Point Y 155 is coupled to or connected to the CPE device 2 152 via a wire or cable 193 in the exemplary embodiment. While only a single Wi-Fi AP Y 155 is shown as receiving services from the CPE device 2 152 at customer premises 2 150, in various embodiments more than one Wi-Fi Access Point may be implemented and coupled and/or connected to CPE device 2 152 and receive services via the CPE device 2 152.

CPE device X (CBRS CPE X) 158 is located at the customer premises X 156 and includes an internal antenna and/or antenna array within the device for communicating with wireless base stations, e.g., CBRS tower base station 1 102 also referred to as CBSD 1.

Customer premises 1 114 includes Wi-Fi Access Point 1 (Wi-Fi AP 1) 122, Wi-Fi AP 2 124, . . . , Wi-Fi AP N 126 (N being an integer greater than 2) which provide Wi-Fi services to the user equipment devices at the customer premises 1 114 which include UE 1 116, UE 2 118, UE 3 119, . . . , UE M 120, where M is an integer greater than 3.

Customer premises 2 150 similarly includes one or more Wi-Fi access points and UE devices though only a single Wi-Fi Access Point Y 155 and user equipment devices UE Y1 191, . . . , UE YR 192 are shown for the sake of simplicity. UE Y1 191, . . . , UE YR 192 being coupled to the Wi-Fi Access Point Y 155 via wireless communications links 194, . . . , 195. The Wi-Fi AP Y 155 being coupled or connected to the CPE 2 152 via a communications link 193 such as for example a wire or cable connection.

Customer premises X 156 includes CPE device X 158, Wi-Fi Access Point X 160 and endpoint or user equipment devices UE X1 162, . . . , UE XP 164, where P is an integer greater than 1. The user equipment devices UE X1 162, . . . , UE XP 164 being coupled or connected to the Wi-Fi AP X 160 via Wi-Fi communications links 163 and 165. The Wi-Fi AP X 160 being coupled or connected to the CPE X via a communications link 159 such as for example a wire or cable connection.

In the exemplary embodiment, the user equipment devices UE 1 116, UE 2 118, UE 3 119, . . . , UE M 120, UE Y1 191, . . . , UE YR 192, and UE X1 162, . . . , UE XP 164 are enabled to wirelessly communicate using a wireless protocol which in this example is a Wi-Fi protocol which is different than the wireless protocol used to communicate between the CPE devices and the wireless base stations which use a 5G protocol such as the CBRS wireless protocol.

In some embodiments, the Wi-Fi Access Points are Wi-Fi routers and the UE devices at the customer premises may be, and in some embodiments are, coupled or connected to the Wi-Fi Access Points or routers via cables or wires.

In some embodiments, the wireless base station 102, e.g., CBSD 1 102 also supports optional CBRS mobile user equipment devices CBRS UE B1 103, . . . , CBRS UE BZ 105 which communicate with the CBSD 1 102 using a 5G or CBRS wireless protocol via 3.5 GHz wireless links 161 and 167 respectively.

The SAS 1 110 is coupled to SAS 2 184 via communications link 178. SAS 1 110 is coupled to FCC Databases 182 via communications link 176. SAS 2 184 is coupled to FCC Databases 182 via communications link 181. ESC system 186 is coupled to SAS 1 110 and SAS 2 184 via communications links 170 and 172 respectively. The ESC System 186 is coupled to the FCC Databases 182 via communications link 173. The ESC system 186 is used to detect and/or sense Navy radar operations in CBRS operation within 3550-3650 MHz near the coasts and provide notifications over the communications links to SAS 1 110 and SAS 2 184. SAS 1 110 manages the CBRS tower base station 1 102 spectrum allocation and transmission power to limit interference in the CBRS network. SAS 2 184 manages CBSDs including other CBRS tower base stations in the CBRS network which are not shown in FIG. 1. SAS 1 110 and SAS 2 184 communicate and share information regarding the CBRS network coverage of the CBSDs including CBRS tower base stations each respectively manage and coordinate management of the allocation of spectrum and power transmission levels of CBSDs including CBRS tower base stations throughout the CBRS network. While only two SAS devices are shown in FIG. 1, it should be understood that additional SAS devices are typically used in the CBRS network. In some embodiments, one or more of the CBRS tower base stations of the CBRS network are also coupled or connected to each other either through wired and/or wireless communications links so that they can communicate and exchange information.

In the exemplary embodiment, the communications links 161, 166, 167, 168, 169 are wireless communications links in the 3.5 GHz frequency spectrum band. The communications link 166 couples or connects the wireless base station 102, e.g., CBRS tower 1 base station 102, to CPE device 1 112. The communications link 168 is also a wireless communications link in the 3.5 GHz frequency spectrum band that couples or connects wireless base station 102 to CPE device 2 152. The communications link 169 is a wireless communications link in the 3.5 GHz frequency spectrum band that couples or connects wireless base station 102 to CPE device X 158. Communications links 161 and 167 are wireless communications links in the 3.5 GHz frequency spectrum band that couples or connects wireless base station 102 to CBRS user equipment devices UE B1 103, . . . , UE BZ 105 respectively.

The CPE devices are fixed or non-mobile devices located at customer premises. In some embodiments the wireless base station 102 only provides wireless services to users via CPE devices and does not support CBRS mobile wireless user equipment devices such as the optional CBRS UE B1 103, . . . , CBRS UE BZ 105 devices.

Communications links 140, 143, 170, 172, 173, 176, 178, 181 are typically wired communications links or fiber optical cables. Communications links 140 couples or connect SAS 1 110 to wireless base station, e.g., CBSD 1 102.

The communications links 130, 132, 134, . . . , 136 are Wi-Fi wireless communications links which couple or connect user equipment device 1 (UE 1) 116, user equipment device 2 (UE 2) 118, user equipment device 3 (UE 3) 119, . . . , user equipment device M 120 to Wi-Fi Access Points as shown in FIG. 1.

The communications links 194 and 195 are Wi-Fi wireless communications links which couple or connect user equipment device UE Y1 191 and user equipment device UE YR 192 to Wi-Fi Access Point Y 155 as shown in FIG. 1.

The communications links 163 and 165 are Wi-Fi wireless communications links which couple or connect user equipment device UE X1 162 and user equipment device UE XP 164 to Wi-Fi Access Point X 160 as shown in FIG. 1.

In the exemplary system 100, one or more of the customer premises do not have wired or optical communications links that provide broadband services to the user devices located at the customer premises instead broadband services are provided by the wireless network, e.g., CBRS network by the wireless communications links coupling the wireless base station 102, e.g., CBRS tower base station 1 102, to the user devices located at the customer premises via the indirect wireless connections via the CPE device and Wi-Fi Access Points located at the customer premises. Exemplary customer premises include campuses (e.g., college campuses), buildings such as for example homes, hospitals, libraries, office buildings, warehouses, parks, etc. and as such have varying diverse demands for the number of user equipment devices and loading that the wireless base station needs to support. In some embodiments, the wireless base station is located in a rural area where cable links are not economical and the wireless base station provides the broadband services to the users located at the customer premises within its cell coverage via the CPE devices. The CPE devices communicate with the wireless base stations through interfaces that operate as CBRS user equipment devices and not as CBSD base stations.

In some embodiments, the CPE devices located at the customer premises include Wi-Fi routers or router circuitry and directly communicate with the Wi-Fi devices within their coverage area without requiring separate Wi-Fi Access Points.

It is to be understood that the communication links shown in system 100 are only exemplary and other network configurations and communications links may be employed that couple together the devices, base stations, access points, nodes, entities, and databases of the system 100. Elements or steps with the same reference numbers used in different figures are the same or similar and those elements or steps will not be described in detail again.

While for the sake of simplicity in explaining the invention system 100 only illustrates a single wireless base station shown as CBRS tower base station device (CBSD), two SAS devices and a few customer premises with a single CPE device located therein servicing a few UE devices through one or more Wi-Fi Access Points, it will be appreciated that system 100 typically includes a large plurality of wireless base stations, e.g., CBRS tower base stations or CBSDs, with a large number, e.g., hundreds, of customer premises within each of the wireless base station's, e.g., CBRS tower base station's, coverage range including a CPE device which is supporting a plurality of Wi-Fi Access Points and a plurality of UE devices at the customer premises with the wireless base stations being managed by a plurality of SAS devices which are in communication with one another.

Figure 3:
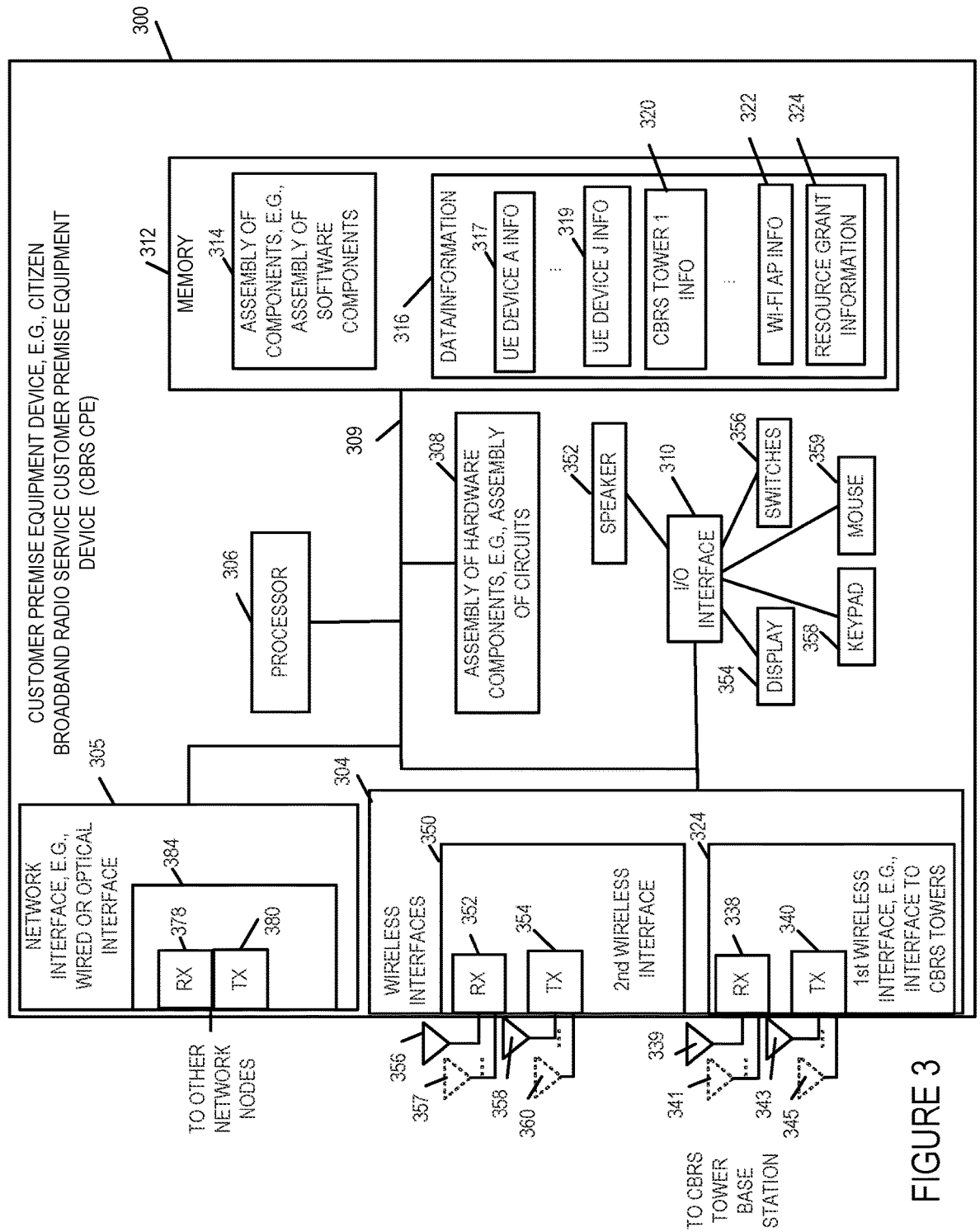
FIG. 3 illustrates details of an exemplary Customer Premises Equipment device, e.g., a Citizens Broadband Radio Service Customer Premise Equipment (CBRS CPE) device, in accordance with one embodiment of the present invention.

FIG. 3 is a drawing of an exemplary CPE device 300, e.g., a Citizens Broadband Radio Service Customer Premise Equipment device 300, in accordance with an exemplary embodiment. Exemplary CPE device 300 includes wireless interfaces 304, a network interface 305, e.g., a wired or optical interface, a processor 306, e.g., a CPU, an assembly of hardware components 308, e.g., an assembly of circuits, and I/O interface 310 and memory 312 coupled together via a bus 309 over which the various elements may interchange data and information. CPE device 300 further includes a speaker 352, a display 354, switches 356, keypad 358 and mouse 359 coupled to I/O interface 310, via which the various I/O devices (352, 354, 356, 358, 359) may communicate with other elements (304, 305, 306, 308, 312) of the CPE device 300. Network interface 305 includes a receiver 378 and a transmitter 380. In some embodiments, receiver 378 and transmitter 380 are part of a transceiver 384. Wireless interfaces 304 include a plurality of wireless interfaces including first wireless interface 324 and a second wireless interface 350. The first wireless interface 324 is used to communicate with the wireless base station, e.g., CBRS tower base station. The second wireless interface is optional and can be used to communicate with a different wireless base station than the first wireless interface for example to obtain additional backhaul capability. The first wireless interface 324 includes wireless receiver 338 and a wireless transmitter 340. In some embodiments, receiver 338 and transmitter 340 are part of a transceiver. In various embodiments, the first wireless interface 324 includes a plurality of wireless receivers and a plurality of wireless transmitters. Wireless receiver 338 is coupled to a plurality of receive antennas (receive antenna 1 339, . . . , receive antenna M 341), via which CPE device 300 can receive wireless signals from other wireless communications devices including a second wireless communications device, e.g., a wireless base station, e.g., CBRS tower base station or CBSD. Wireless transmitter 340 is coupled to a plurality of wireless transmit antennas (transmit antenna 1 343, . . . , transmit antenna N 345) via which the CPE device 300 can transmit signals to other wireless communications devices including a second wireless communications device, e.g., wireless base station such as a CBRS tower base station. The antennas 339, . . . , 341 and 343, . . . , 345 are typically mounted on the roof of the building in which the CPE device is located or on a poll at an elevated height with the other elements of the CPE device being connected to the antennas via a wired or fiber optic connection. In some embodiments the various antennas form an antenna array with the antennas pointing in different directions. In some embodiments, one or more of the antennas are included inside the housing of the CPE device and the CPE device includes one or more connections to which exterior antennas may be connected.

The second optional wireless interface 350 includes wireless receiver 352 and a wireless transmitter 354. In some embodiments, receiver 352 and transmitter 354 are part of a transceiver. In various embodiments, the second wireless interface 350 includes a plurality of wireless receivers and a plurality of wireless transmitters. Wireless receiver 352 is coupled to one or more receive antennas (receive antenna 1 356, . . . , receive antenna M 357), via which CPE device 300 can receive wireless signals from other wireless communications devices including a second wireless communications device, e.g., a second wireless base station using the same or a different wireless protocol than the first wireless interface. Wireless transmitter 354 is coupled to one or more wireless transmit antennas (transmit antenna 1 358, . . . , transmit antenna N 360) via which the CPE device 300 can transmit signals to other wireless communications devices including a second wireless communications device. In some embodiments, the second wireless interfaces 350 are Wi-Fi interfaces so that the CPE device can communication over Wi-Fi wireless links to user equipment devices. In some such embodiments, the CPE device includes one or more hardware and/or software components that provide wireless routing services for the Wi-Fi interfaces and the CPE device also acts as a Wi-Fi router.

The CPE device network interface 305 may be coupled to Wi-Fi Access Points, LAN networks, WANs, routers, e.g., WiFi routers or Access Points, so that various devices in the home without wireless interfaces can also be serviced via wired or optical links by the CPE device 300.

Memory 312 includes an assembly of components 314, e.g., an assembly of software components, and data/information 316. Data/information 316 includes UE device information corresponding to a plurality of user equipment devices (UE device A information 317, . . . , UE device J information 319 where A to M are the UE devices being serviced by the CPE device) and wireless device base station information (e.g., CBRS tower base station 1 information 320) and Wi-Fi Access Point Information 322 which includes information about the Wi-Fi Access Points connected to the CPE device, Resource Grant information 324 including information on uplink resources granted and/or assigned to the CPE device for use by CPE device to transmit data to the wireless base station e.g., CBRS Tower 1 (CBSD 1) e.g., in connection with services provided via the wireless network, e.g., voice and/or video calls, uploading of sensor data, etc. In some embodiments, one or more of the CPE devices shown and/or discussed in connection with the Figures and methods discussed herein including one or more of CPE device 1 112, CPE device 2 152, . . . , CPE device X 158 are implemented in accordance with CPE device 300.

Figure 4:
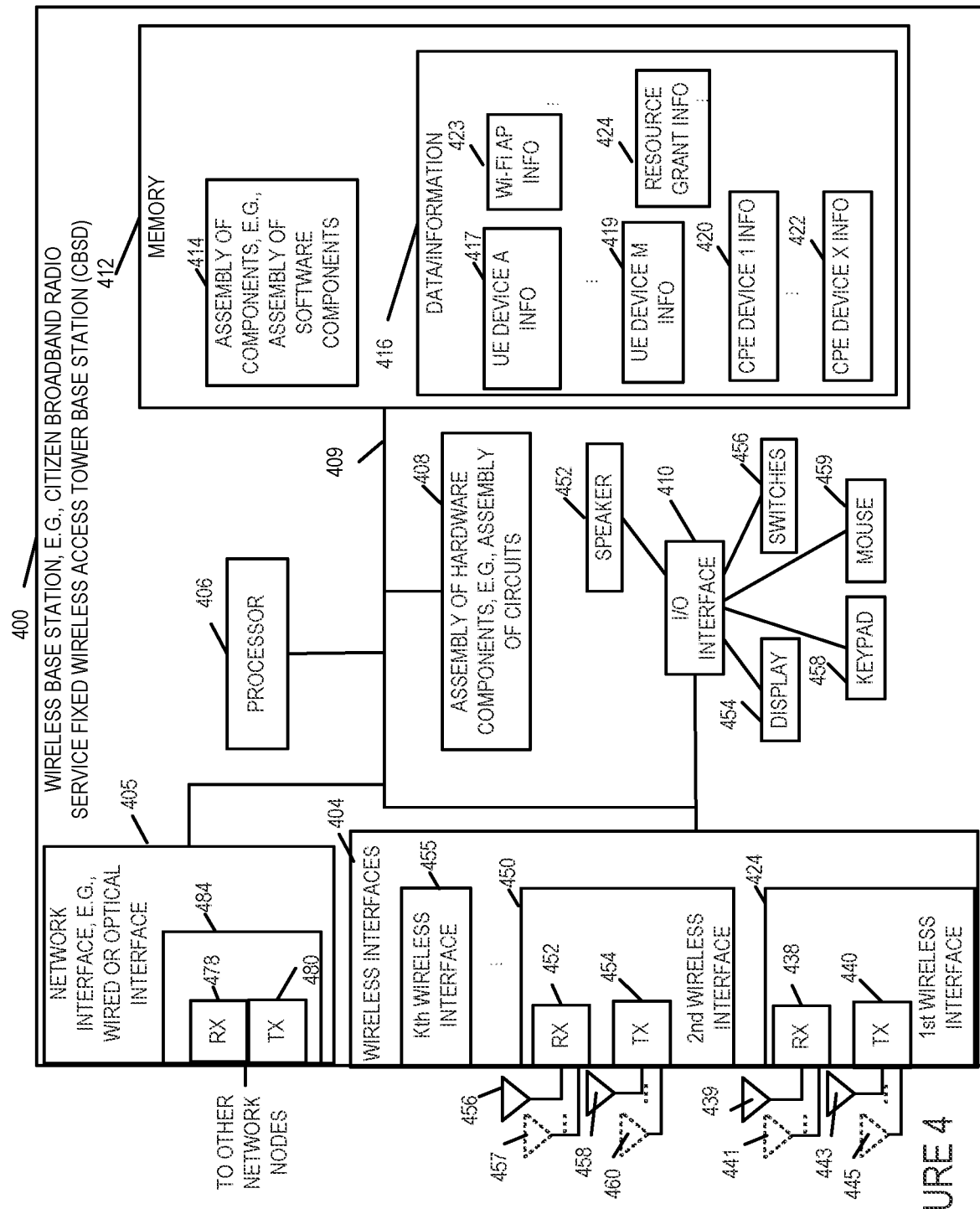
FIG. 4 illustrates details of an exemplary wireless base station, e.g., a Citizens Broadband Radio Service tower base station also referred to as Citizens Broadband Radio Service Device, in accordance with one embodiment of the present invention.

FIG. 4 is a drawing of an exemplary wireless base station 400, e.g., a Citizens Broadband Radio Service Fixed Wireless Access Tower Base Station (CBSD) 400, in accordance with an exemplary embodiment. Exemplary wireless base station 400, e.g., CBRS tower base station 400, includes a wireless interface 404, a network interface 405, e.g., a wired or optical interface, a processor 406, e.g., a CPU, an assembly of hardware components 408, e.g., an assembly of circuits, and I/O interface 410 and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. Wireless interfaces 404 include a plurality of wireless interfaces including first wireless interface 424, second wireless interface 450, . . . , Kth wireless interface 455. The wireless interfaces are used to communicate with the CPE devices and CBRS UE devices. The first wireless interface 424 is used for example to communicate with a CPE device, e.g., CPE 1 112. The second wireless interface can be used to communicate with a CBRS enabled user equipment device, e.g., CBRS UE B1 103. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a CPE device or a CBRS user equipment device. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., CPE device or a CBRS user equipment device.

The second wireless interface 450 includes wireless receiver 452 and a wireless transmitter 454. In some embodiments, receiver 452 and transmitter 454 are part of a transceiver. In various embodiments, the second wireless interface 450 includes a plurality of wireless receivers and a plurality of wireless transmitters. Wireless receiver 452 is coupled to one or more receive antennas (receive antenna 1 456, . . . , receive antenna M 457), via which wireless base station 400 can receive wireless signals from other wireless communications devices including a second wireless communications device, e.g., a CPE device or CBRS UE device, using the same or a different wireless protocol than the first wireless interface. Wireless transmitter 454 is coupled to one or more wireless transmit antennas (transmit antenna 1 458, . . . , transmit antenna N 460) via which the wireless base station 400 can transmit signals to other wireless communications devices including a second wireless communications device. The wireless base station network interface 405 may be coupled to a SAS system, other networks, e.g., internet, or other wireless base stations.

Memory 412 includes an assembly of components 414, e.g., an assembly of software components, and data/information 416. Data/information 416 includes CBRS UE device information corresponding to a plurality of CBRS user equipment devices (UE device A information 417, . . . , UE device M information 419 where A to M are the CBRS UE devices being serviced by the wireless base station such as for example CBRS UE B1 103, . . . CBRS UE BZ), CPE device information (CPE device 1 information 420, . . . , CPE device X information 422), Wi-Fi Access Point information 423. and resource grant information 424. While the details of the first and second wireless interfaces are shown, the other wireless interfaces of the wireless base station, e.g., wireless interface K where K is an integer greater than 2 also include multiple receivers and transmitters so that the wireless base station 400 can provide wireless services to for example hundreds of CPE devices and thousands of user equipment devices. The CPE device information includes CPE device profile record(s), information on the uplink data transmission resource grants assigned to the CPE device, the uplink resource utilization of the CPE device, the CPE device ID and/or signature used to identify/decode communications from the CPE device. The resource grant information includes information on the uplink data transmission resource grants assigned to each CPE device and UE device supported and/or connected to the wireless base station, an indication of which resources/resource grants are being shared, the number of collisions on a shared resources, statistics on the utilization of resources by the CPE devices, the set of resource blocks included in each resource grant, the number of skipped uplink data transmission opportunities for each resource grant and each CPE device, the amount of resource blocks in a set of resource blocks utilized during each uplink data transmission, statistics on the resource blocks and/or resource grants being fully utilized and/or amount of utilization of the resource blocks and/or resource grants. In some embodiments, one or more of the wireless base stations discussed and/or shown in the Figures and/or in connection with the methods discussed herein including wireless base station 102 are implemented in accordance with the wireless base station 400.

Figure 5:
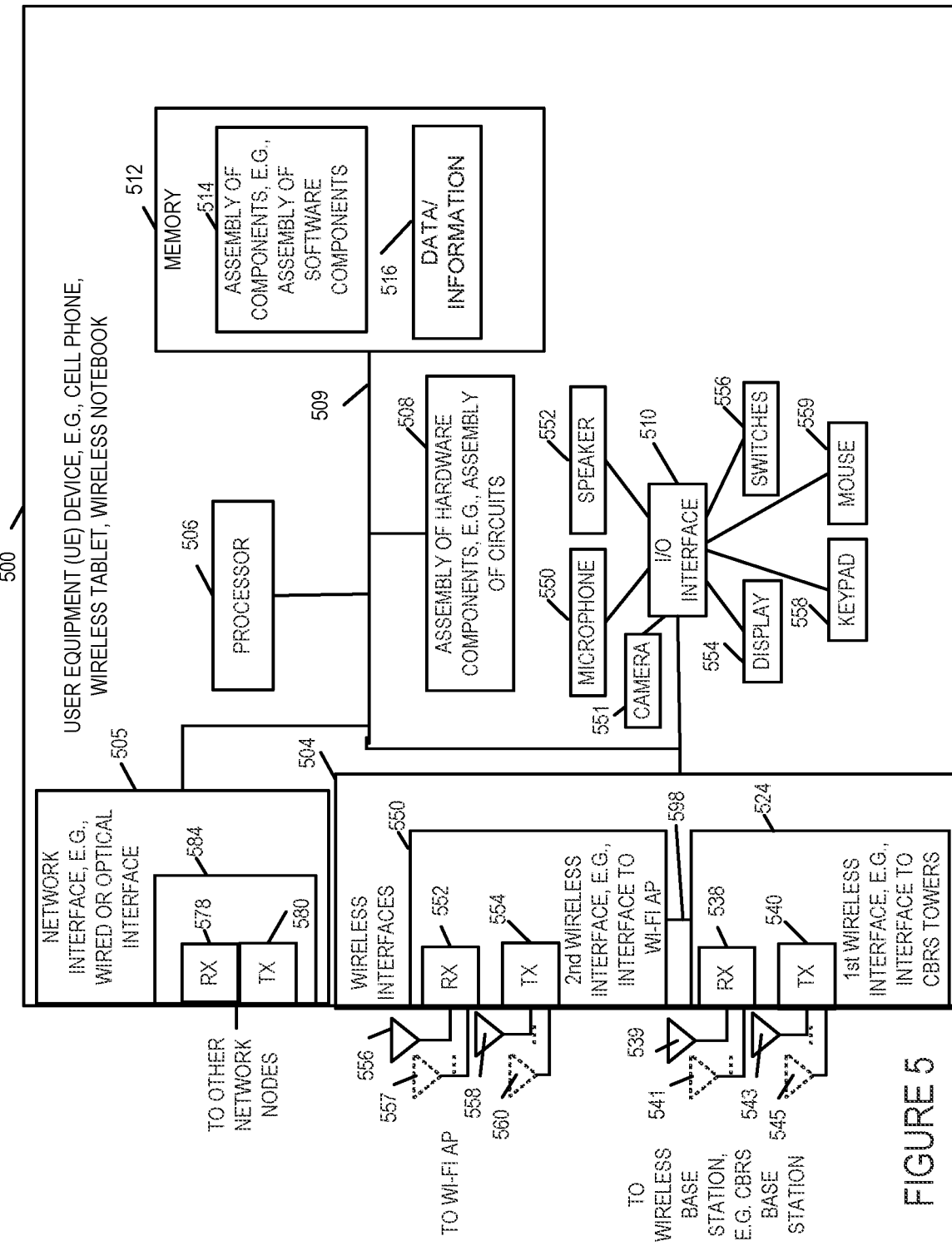
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a computer, a mobile device such as a cell phone, a smart phone, wireless tablet or wireless notebook, a smartTV, internet cable box, internet enabled device, WiFi device. UE device 500 includes WiFi device capabilities. UE device 500 in addition to having Wi-Fi device capabilities is also optionally enabled to communicate using at least one other wireless protocol, e.g., 5G wireless protocol, CBRS wireless protocol or cellular wireless protocol. The UE device 500 in some embodiments is a CBRS user equipment device operating at the 3.5 GHz band which also has Wi-Fi capabilities and can be operated to work in dual mode where it is capable of receiving packets via two different paths or two different wireless protocol connections. For example the first path or wireless protocol connection being a Wi-Fi protocol connection or channel and a second path or wireless protocol connection being via a 5G wireless protocol connection or channel, CBRS wireless protocol connection or channel or a cellular protocol connection or channel. Exemplary UE device 500 includes wireless interfaces 504, a network interface 505, a processor 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. The network interface 505 can be coupled to routers within the home or customer premises or to wired (e.g., cable) or optical (e.g., fiber-optic) networks. In some embodiments, receiver 578 and transmitter 580 are part of a transceiver 584.

Wireless interfaces 504 include a plurality of wireless interfaces including first wireless interface 524 and a second wireless interface 550. The first wireless interface 524 is used to communicate with the wireless base station, e.g., CBRS tower base station. The second wireless interface is used to communicate with a Wi-Fi Access Point. The first wireless interface 524 includes wireless receiver 538 and a wireless transmitter 540. In some embodiments, receiver 538 and transmitter 540 are part of a transceiver. In various embodiments, the first wireless interface 524 includes a plurality of wireless receivers and a plurality of wireless transmitters. Wireless receiver 538 is coupled to a plurality of receive antennas (receive antenna 1 539, . . . , receive antenna M 541), via which user equipment device 500 can receive wireless signals from other wireless communications devices including a wireless base station, e.g., wireless base station 102, e.g., CBRS tower base station or CBSD for example using 3.5 GHz bandwidth spectrum. Wireless transmitter 540 is coupled to a plurality of wireless transmit antennas (transmit antenna 1 543, . . . , transmit antenna N 545) via which the user equipment device 500 can transmit signals to other wireless communications devices including a second wireless communications device, e.g., wireless base station such as a CBRS tower base station. The antennas 539, . . . , 541 and 543, . . . , 545 are typically mounted inside the housing of the wireless device but in some embodiments are located outside the user equipment device housing. In some embodiments the various antennas form an antenna array with the antennas pointing in different directions. In some embodiments, one or more of the antennas are included inside the housing of the user equipment device and the user equipment device includes one or more connections to which exterior antennas may be connected.

The second wireless interface 550 includes wireless receiver 552 and a wireless transmitter 554. In some embodiments, receiver 552 and transmitter 554 are part of a transceiver. In various embodiments, the second wireless interface 550 includes a plurality of wireless receivers and a plurality of wireless transmitters. Wireless receiver 552 is coupled to one or more receive antennas (receive antenna 1 556, . . . , receive antenna M 557), via which user device 500 can receive wireless signals from other wireless communications devices including a second wireless communications device, e.g., a Wi-Fi Access Point using Wi-Fi protocol. Wireless transmitter 554 is coupled to one or more wireless transmit antennas (transmit antenna 1 558, . . . , transmit antenna N 560) via which the user equipment device 500 can transmit signals to other wireless communications devices including a second wireless communications device. The user equipment device network interface 505 may be coupled to LAN or WAN networks or routers so that the user equipment device can also obtain services via a hardwired connection in addition to through the wireless interfaces. In the exemplary embodiment the second wireless interface is a Wi-Fi wireless interface. The first wireless interface is connected or coupled to the second wireless interface via wire 598 so that the two interfaces can exchange information.

Memory 512 includes an assembly of components 514, e.g., an assembly of software components, and data/information 516.

In some embodiments, one or more of the user equipment devices shown in the figures or discussed herein for example in connection with the methods described including for example UE devices UE 1 116, UE 2 118, UE 3 119, . . . , UE M 120, UE X1 162, . . . , UE XP 164, UE Y1 191, . . . , UE YR 192, CBRS UE B1 103, . . . , CBRS UE BZ 105 are implemented in accordance with exemplary user equipment device 500. While the UE device 500 has been illustrated as a dual mode device that has two wireless interfaces 550 and 524, the UE device 500 may, and in some embodiments, is not a dual mode device but instead is a single mode operation device with a single wireless interface either wireless interface 1 524 which is enable to communicate with a wireless base station using a first wireless protocol, e.g., a 5G protocol, 4G protocol, LTE protocol or CBRS wireless protocol, or wireless interface 2 550 which is a Wi-Fi interface which is enabled to communicate with a Wi-Fi Access Point or router. For example, CBRS UE B1 103, . . . , CBRS UE BZ 105 in some embodiments include the first wireless interface 524 through which they communicate with the wireless base station 102 and do not include the second wireless interface 550 which is a Wi-Fi wireless interface. Similarly, in many embodiments, UE devices UE 1 116, UE 2 118, UE 3 119, . . . , UE M 120, UE X1 162, . . . , UE XP 164, UE Y1 191, . . . , UE YR 192 include a single wireless interface, wireless interface 550 through which they communicate with a Wi-Fi access point or router located at the customer premises at which the UE device is located.

Figure 6:
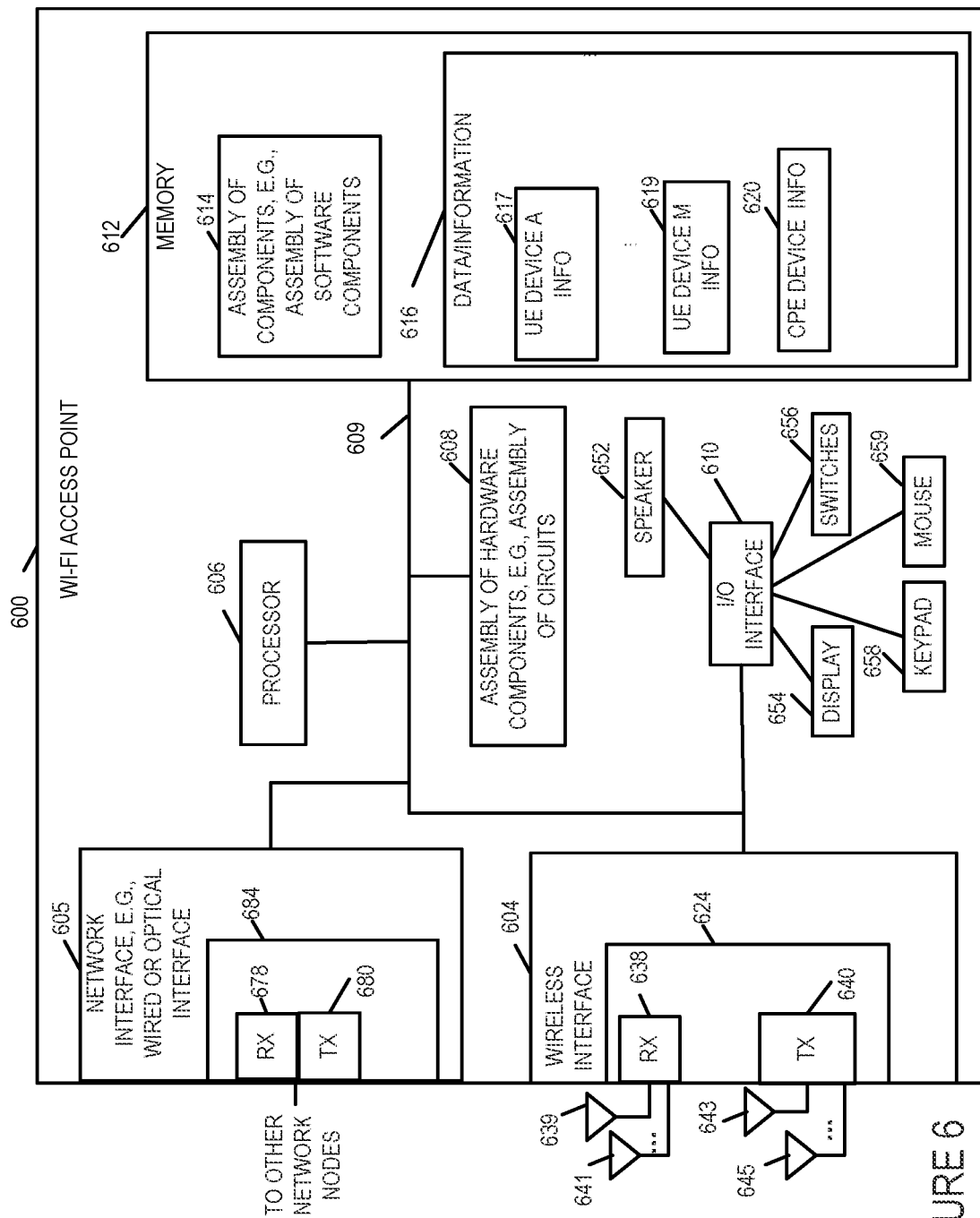
FIG. 6 illustrates details of an exemplary Wi-Fi Access Point in accordance with one embodiment of the present invention.

FIG. 6 is a drawing of an exemplary Wi-Fi Access Point 600 in accordance with an exemplary embodiment. Exemplary Wi-Fi Access Point 600 includes a wireless interface 604, e.g., a Wi-Fi interface for transmitting, receiving and processing Wi-Fi messages/packets, a network interface 605, e.g., a wired or optical interface, a processor 606, e.g., a CPU, an assembly of hardware components 608, e.g., an assembly of circuits, and I/O interface 610 and memory 612 coupled together via a bus 609 over which the various elements may interchange data and information. Wi-Fi Access Point 600 further includes a speaker 652, a display 654, switches 656, keypad 658 and mouse 659 coupled to I/O interface 610, via which the various I/O devices (652, 654, 656, 658, 659) may communicate with other elements (604, 605, 606, 608, 612) of the Wi-Fi Access Point 600. Network interface 605 includes a receiver 678 and a transmitter 680. The network interface 605 is typically connected or coupled to a wired or optical communications link or network which in turn is coupled or connected to a CPE device. In some embodiments, receiver 678 and transmitter 680 are part of a transceiver 684. Wireless interface 604 includes a wireless receiver 638 and a wireless transmitter 640. In some embodiments, receiver 638 and transmitter 640 are part of a transceiver 624. In various embodiments, wireless interface 604 includes a plurality of wireless receivers and a plurality of wireless transmitters. Wireless receiver 638 is coupled to a plurality of receive antennas (receive antenna 1 639, . . . , receive antenna M 641), via which Wi-Fi Access Point 600 can receive wireless signals from other wireless communications devices including a second wireless communications device, e.g., a UE device. Wireless transmitter 640 is coupled to a plurality of wireless transmit antennas (transmit antenna 1 643, . . . , transmit antenna N 645) via which the Wi-Fi Access Point 600 can transmit signals to other wireless communications devices e.g., a UE device.

Memory 612 includes an assembly of components 614, e.g., an assembly of software components, and data/information 616. Data/information 616 includes UE device information corresponding to a plurality of user equipment devices (UE device A information 617, . . . , UE device M information 619 where A to M are the UE devices being serviced by the Wi-Fi Access Point) and CPE device information (e.g., CPE device 1 information, CPE device 1 being the CPE device to which the Wi-Fi AP is connected to) 620. The Wi-Fi Access Point includes in some embodiments multiple wireless interfaces or a wireless interface with multiple receivers and transmitters so that it can provides wireless services to a plurality of user equipment devices. In some embodiments, one or more of Wi-Fi Access Points discussed and/or shown in the Figures and/or in connection with the methods discussed herein including Wi-Fi Access Points 122, 124, . . . , 126, 155, and 160 are implemented in accordance with the Wi-Fi Access Point 600.

Figure 7:
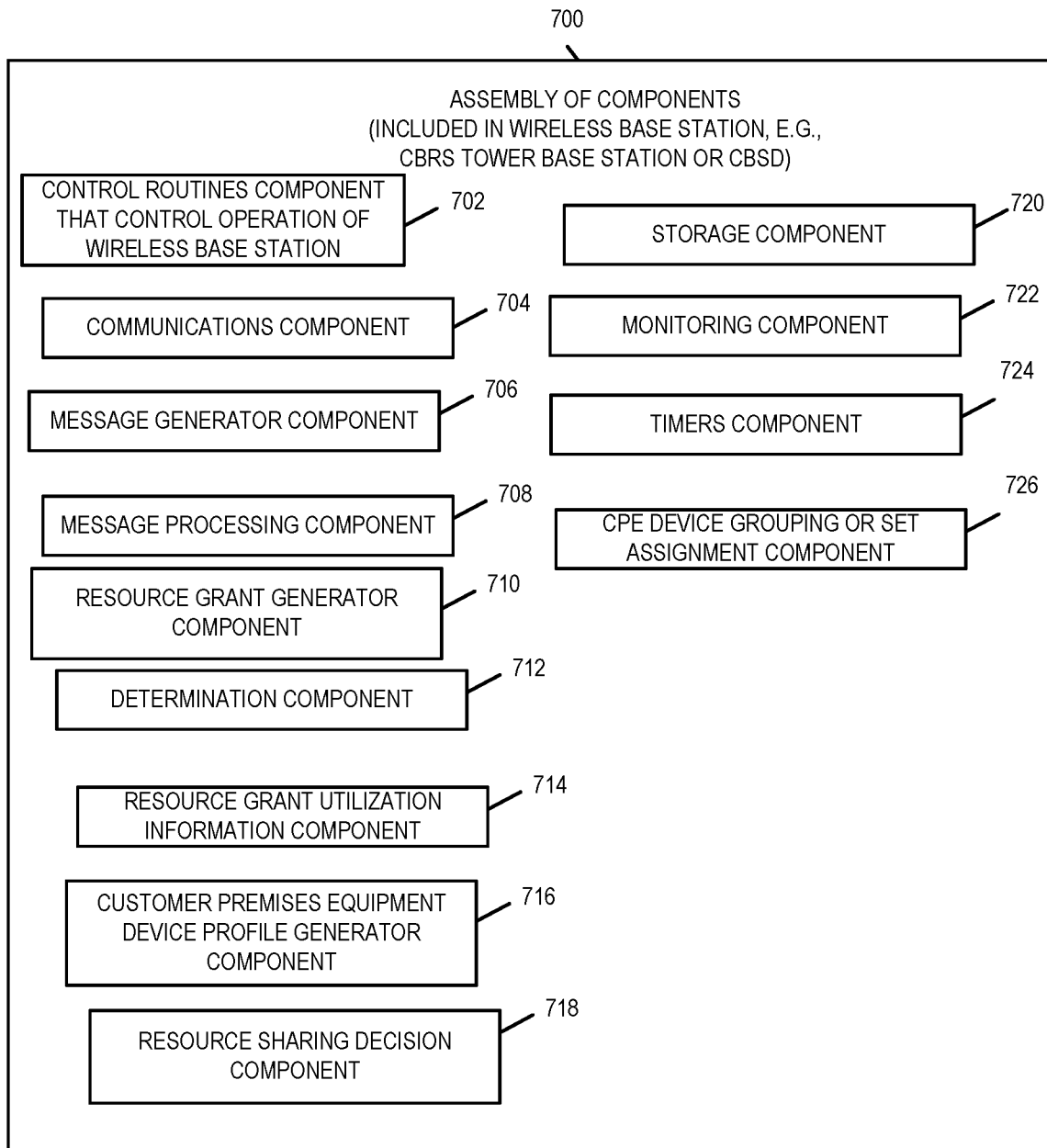
FIG. 7 illustrates an exemplary assembly of components for a wireless base station, e.g., CBRS tower base station or CBSD, in accordance with an embodiment of the present invention.

FIG. 7 is a drawing of an exemplary assembly of components 700 which may be included in a wireless base station, e.g., exemplary wireless base station 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station device 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station device 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions or operations corresponding to one or more described and/or illustrated steps of an exemplary method.

Assembly of components 700 includes a control routines component 702, a communications component 704, a message generator component 706, a message processing component 708, a resource grant generator component 710, a determination component 712, an resource grant utilization component 714, a customer premises equipment device profile generator component 716, a resource sharing decision component 718, a storage component 720, a monitoring component 722, a timers component 724, a CPE device grouping or set assignment component 726.

The control routines component 702 is configured to control operation of the wireless base station. The communications component 704 is configured to handle communications, e.g., transmission and reception of messages, sending of ACK and NACK messages, and protocol signaling for the wireless base station. The message generator component 706 is configured to generate messages for transmission to other devices. The message processing component 708 is configured to process received messages and is sometimes a sub-component of communications component 704. The determination component 712 makes various determinations for the wireless base station including for example, determining the resource grants, e.g., uplink data transmission resource grant assignments, for CPE devices and CBRS UE devices, determining which resource grants are to be shared by which CPE devices, determining statistics based on measured or monitored utilization of resources and collisions in uplink data transmission attempts on shared uplink resources, determining skipped uplink data transmission opportunities, determining resource utilization information (e.g., uplink data transmission resource utilization per CPE device), determining which CPE device transmitted the data received on resource blocks of a shared resource grant, location of the customer premises equipment device, customer premises equipment device software type, version, and/or release, customer premises equipment device hardware type, version, and/or release, an amount of downlink traffic communicated from the wireless base station to a customer premises equipment device during a time period, an amount of uplink traffic communicated from a customer premises equipment device to a wireless base station during a time period.

The resource grants generator component 714 is configured to generate resource grants, e.g., uplink data transmission resource grants for CPE devices and CBRS UE devices and to generate updated resource grants/resource grant scheduled based on resource utilization information.

The customer premises equipment device profile generator component 716 generates customer premises equipment device profiles for example based on a CPE device's characteristics, attributes and/or properties including monitored activity such as uplink resource grant utilization.

The resource sharing decision component 718 makes decisions on which resources, e.g., uplink data transmission resources, e.g., set of resource block comprising a uplink resource grant, are to be shared by CPE devices for example based on information about the resource utilization of the uplink resources over a period of time.

The storage component 720 controls the storage and retrieval of information and data in the memory of the wireless base station.

The monitoring component 726 monitors wireless base station activities, customer premises equipment device activities, and user equipment device activities. The monitoring of wireless base station activities includes monitoring the uplink data transmission resource grant utilization over a period of time, the number of collisions of uplink data transmitted from CPE devices, the number of skipped uplink data transmission opportunities.

The timers component 724 measures and tracks periods of time such as a first period of time and a second period of time.

The CPE device grouping or set assignment component 726 assigns CPE devices to a CPE device group and/or CPE device set based on utilization of granted uplink data transmission resources, e.g., set or sets of recurring resource blocks for transmitting data from the CPE device to the wireless base station.

Figure 8:
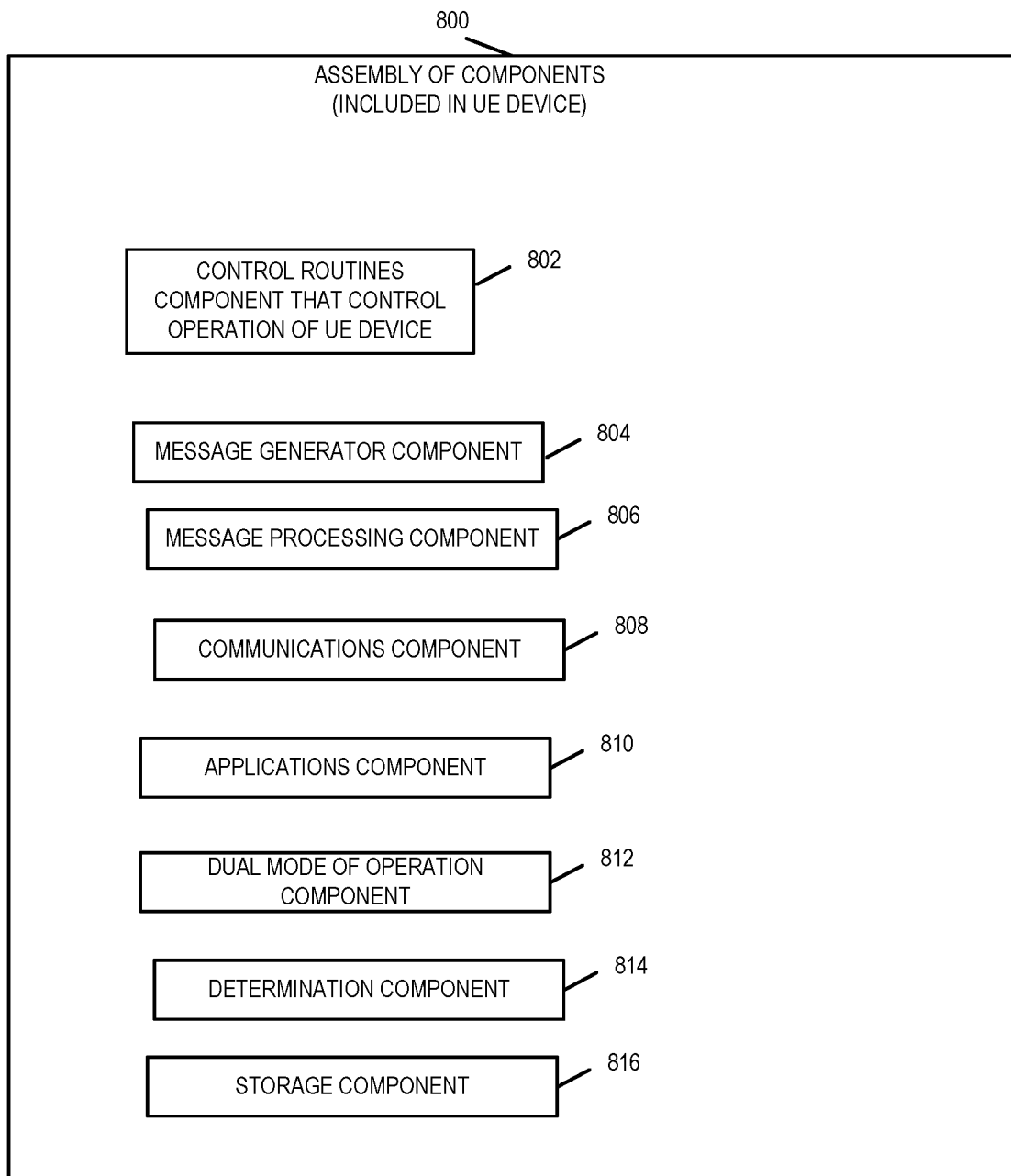
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a message generator component 804, a message processing component 806, a communications component 808, an applications component 810, an optional dual mode of operation component 812, a determination component 814, a storage component 816.

The control routines component 802 is configured to control operation of the UE. The message generator component 804 is configured to generate messages for transmission to various devices including for example a Wi-Fi Access Point when the UE device is a Wi-Fi device and wireless base station (e.g., CBSD) when the device is a CBRS UE device. In some embodiments in which the UE is a dual mode of operation device it is also configured to generate messages for transmission to both wireless base stations using a first protocol (e.g., CBRS wireless protocol, 4G wireless protocol or 5G wireless protocol and to a Wi-Fi access point using a second wireless protocol, i.e., a Wi-Fi wireless protocol. The message processing component 806 is configured to process messages received from other devices, e.g., a wireless base station or a Wi-Fi Access Point. In some embodiments, the message processing component 806 is a sub-component of the communications component 808. The communications component 808 is configured to handle communications, e.g., receipt and transmission of signals and provide protocol signal processing for one or more protocols for the UE. The applications component 810 is configured to provide various application services for the UE device, e.g., voice over internet protocol calling services, video on demand services, media download services, conferencing services, internet access and web browsing services, etc. The dual mode of operation component 812 is an optional component which is present in dual mode operation devices that operate using two different wireless protocols. The dual mode of operation component 812 is configured to establish different transmission paths for receiving data packets using different wireless protocols (e.g., CBRS or 5G wireless protocol and Wi-Fi protocol) depending on the selection of the mode of operation e.g. The determination component 814 is responsible for making determinations at the user equipment device including for example the selection of the mode of operation (e.g., CBRS or 5G wireless protocol and Wi-Fi protocol). The storage component 816 controls the storage and retrieval of information and data in the memory of user equipment device.

Figure 9:
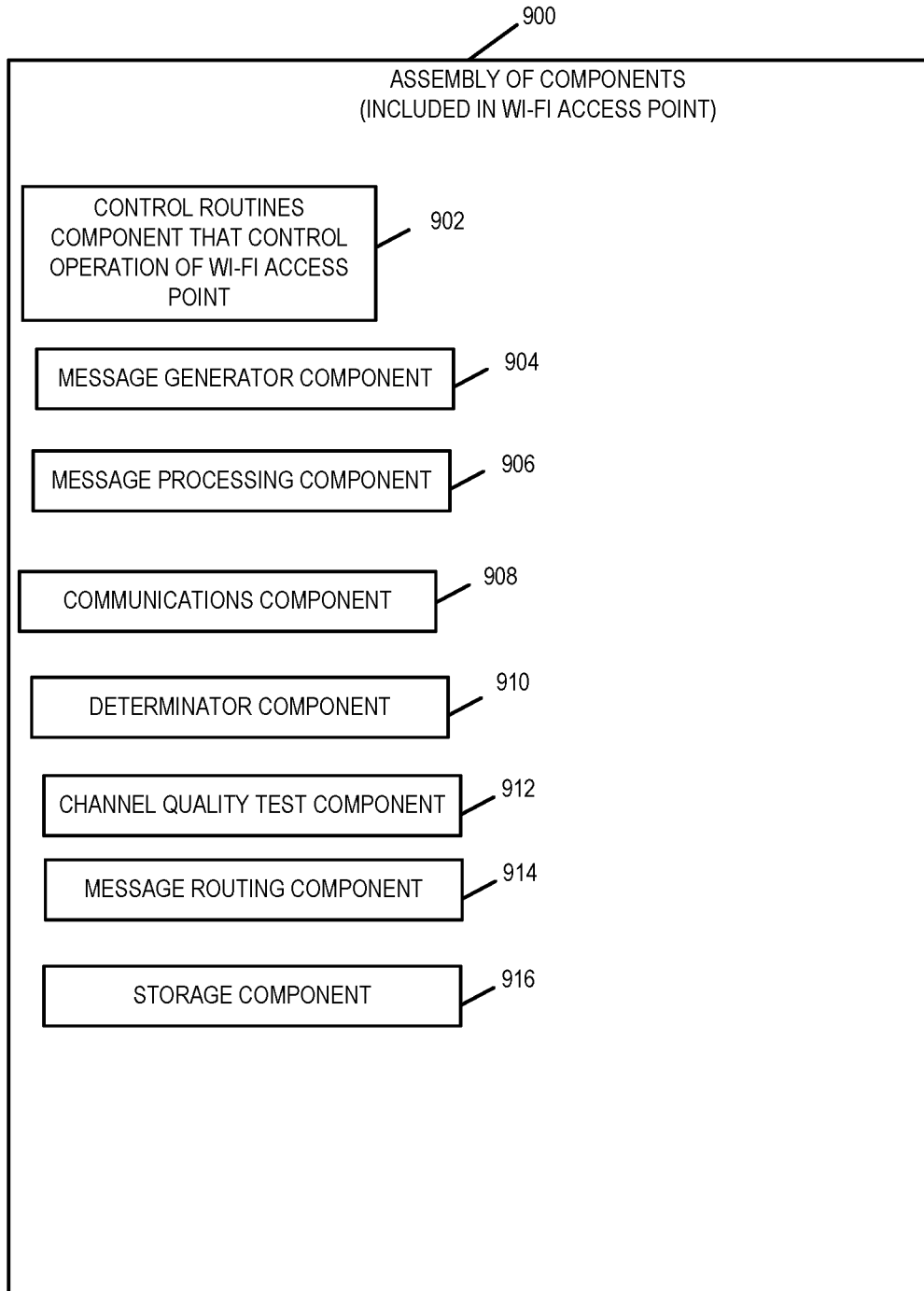
FIG. 9 illustrates an exemplary assembly of components for a Wi-Fi Access Point in accordance with an embodiment of the present invention.

FIG. 9 is a drawing of an exemplary assembly of components 900 which may be included in an exemplary Wi-Fi Access Point, e.g., exemplary Wi-Fi Access Point 600 of FIG. 6, in accordance with an exemplary embodiment. The components in the assembly of components 900 can, and in some embodiments are, implemented fully in hardware within a processor, e.g., processor 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor 606 with other components being implemented, e.g., as circuits within assembly of components 608, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 612 of the Wi-Fi Access Point 600, with the components controlling operation of Wi-Fi Access Point 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 606, configure the processor to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the Wi-Fi Access Point 600 or elements therein such as the processor 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a message generator component 904, a message processing component 906, a communications component 908, a determinator component 910, channel quality test component 912, a message routing component 914 and a storage component 916.

The control routines component 902 is configured to control operation of the Wi-Fi Access Point. The message generator component 904 is configured to generate messages for transmission to a CPE device and user equipment devices. The message processing component 906 processes received messages and takes actions based on the processed messages. The communications component 908 is configured to handle communications between the Wi-Fi Access Point and other devices, e.g., CPE device and user equipment devices. The determinator component 910 makes determinations for the Wi-Fi Access Point including which UE devices are to be provided services and which are not. The channel quality test component 912 performs communications channel, e.g., Wi-Fi channels/connections, quality and signaling condition tests. The message routing component 914 routes messages received at the Wi-Fi Access Point toward their intended destinations. The storage component 916 is responsible for the storage and retrieval of data and information in the memory of the Wi-Fi Access Point.

Figure 10:
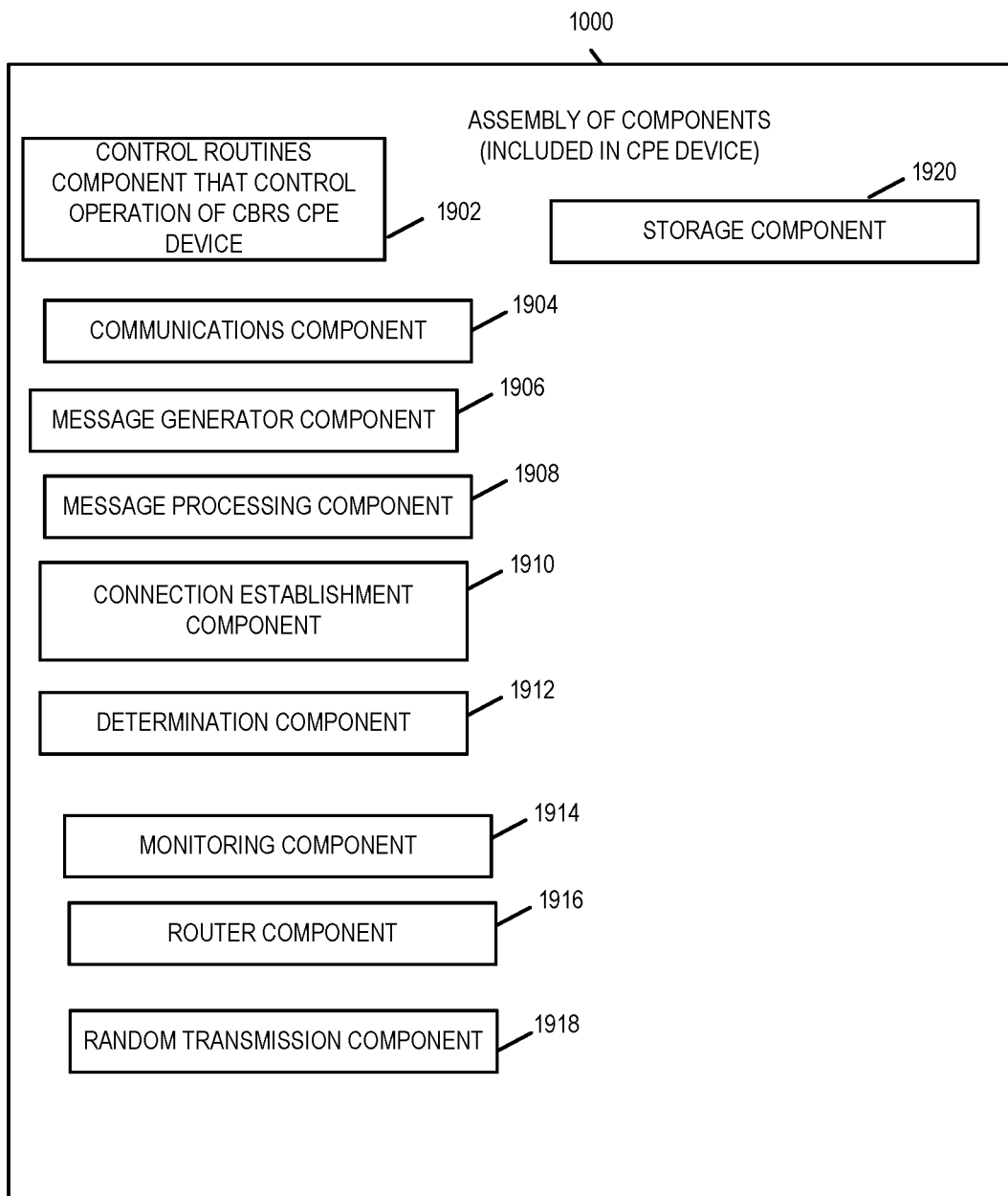
FIG. 10 illustrates an exemplary assembly of components for a customer premises equipment (CPE) device, e.g., CBRS CPE device, in accordance with an embodiment of the present invention.

FIG. 10 is a drawing of an exemplary assembly of components 1000 which may be included in an exemplary CPE device, e.g., exemplary CPE device 300 of FIG. 3, in accordance with an exemplary embodiment. The components in the assembly of components 1000 can, and in some embodiments are, implemented fully in hardware within a processor, e.g., processor 306, e.g., as individual circuits. The components in the assembly of components 1000 can, and in some embodiments are, implemented fully in hardware within the assembly of hardware components 308, e.g., as individual circuits corresponding to the different components. In other embodiments some of the components are implemented, e.g., as circuits, within processor 306 with other components being implemented, e.g., as circuits within assembly of components 308, external to and coupled to the processor 306. As should be appreciated the level of integration of components on the processor and/or with some components being external to the processor may be one of design choice. Alternatively, rather than being implemented as circuits, all or some of the components may be implemented in software and stored in the memory 312 of the CPE device 300, with the components controlling operation of CPE device 300 to implement the functions corresponding to the components when the components are executed by a processor e.g., processor 306. In some such embodiments, the assembly of components 1000 is included in the memory 312 as assembly of software components 314. In still other embodiments, various components in assembly of components 1000 are implemented as a combination of hardware and software, e.g., with another circuit external to the processor providing input to the processor which then under software control operates to perform a portion of a component's function.

When implemented in software the components include code, which when executed by a processor, e.g., processor 306, configure the processor to implement the function corresponding to the component. In embodiments where the assembly of components 1000 is stored in the memory 312, the memory 312 is a computer program product comprising a computer readable medium comprising code, e.g., individual code for each component, for causing at least one computer, e.g., processor 306, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 10 control and/or configure the CPE device 300 or elements therein such as the processor 306, to perform the functions of corresponding steps illustrated and/or described in the method of one or more of the flowcharts, signaling diagrams and/or described with respect to any of the Figures. Thus the assembly of components 1000 includes various components that perform functions of corresponding one or more described and/or illustrated steps of an exemplary method.

Assembly of components 1000 includes a control routines component 1902, a communications component 1904, message generator component 1906, a message processing component 1908, a connection establishment component 1910, a determination component 1912, a monitoring component 1914, a router component 1916, a random uplink transmission component 1918, and a storage component 1920.

The control routines component 1902 controls the operation of the CPE device. The communications component 1904 performs operations for handling communications with other devices including generation, transmission, receiving, and processing messages, establishing connections, signal processing for different communications protocols. The message generator component 1906 generates messages and signals, e.g., messages/signals to be sent to the Wi-Fi access points, UE devices, wireless base station including access request signals/message, and response/acknowledgement messages. In some embodiments, the message generator component 1906 is a sub-component of communications component 1904. The message processing component 1908 processes received messages and performs operations in response to received messages.

The connection establishment component 1910 handles establishment and termination of communications connections, e.g., device to device communications connections between the wireless base station and the CPE device and the CPE device and the Wi-Fi Access Points. In some embodiments, the connection establishment component 1910 is a sub-component of communications component 1904.

The determination component 1912 makes various determinations for the CPE device including whether the CPE device has any data to transmit in an uplink data transmission opportunity, whether to transmit using an uplink data transmission opportunity or not, whether to increase or decrease the use of a shared uplink data transmission grant for example in response to ACK and NACK messages, and determining statistics for which uplink data transmission opportunities to utilize to avoid collisions.

The monitoring component 1914 monitors for various conditions e.g., conditions indicative of a collision with another CPE device in an uplink data transmission attempt such as the receipt of a NACK in response to uplink transmission, condition indicative of a successful uplink data transmission such as a ACK message in response to an uplink transmission. The router component 1916 routes received messages to destination devices or to the next hop on the path to the destination. The random transmission component 1918 randomly determines which shared resource grant transmission opportunities to utilize for transmitting uplink data, i.e., the component determines using random probability which uplink data transmission opportunities on a shared uplink data transmission resource grant, i.e., set of resource blocks shared for use with one or more other CPE devices, to use for sending uplink data to the wireless base station. The randomness of the use of the shared uplink resource grant is done to minimize or reduce the number of collisions when more than one CPE device is attempting to the use the shared uplink data transmission resource. The random transmission component in some embodiments is a sub-component of the of the communications component 1904. The storage component 1920 is responsible for the management of the storage and retrieval of data and information in the memory of the CPE device.

Figure 2A:
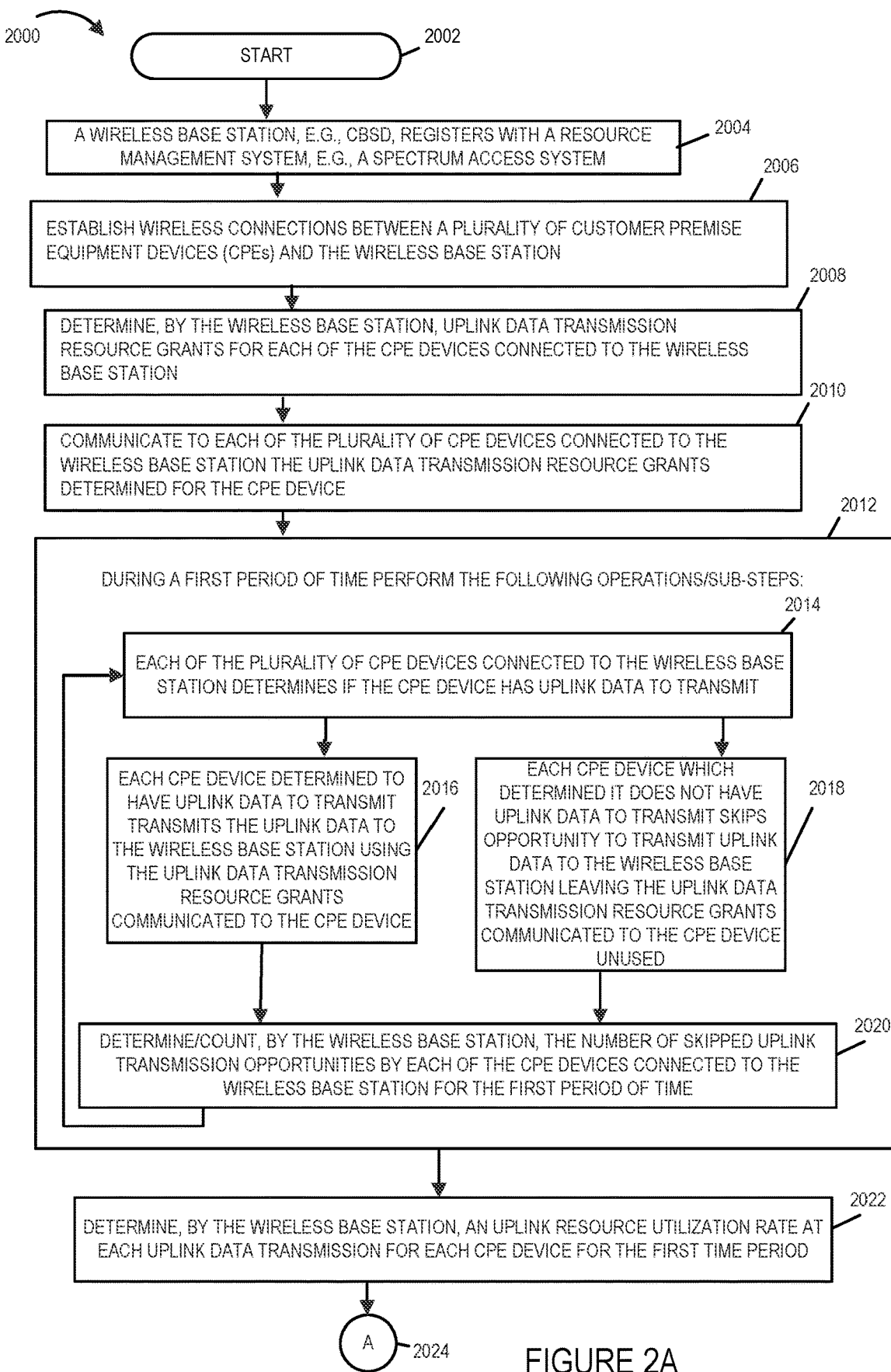
FIG. 2A illustrates the steps of the first part of an exemplary method in accordance with one embodiment of the present invention.
Figure 2C:
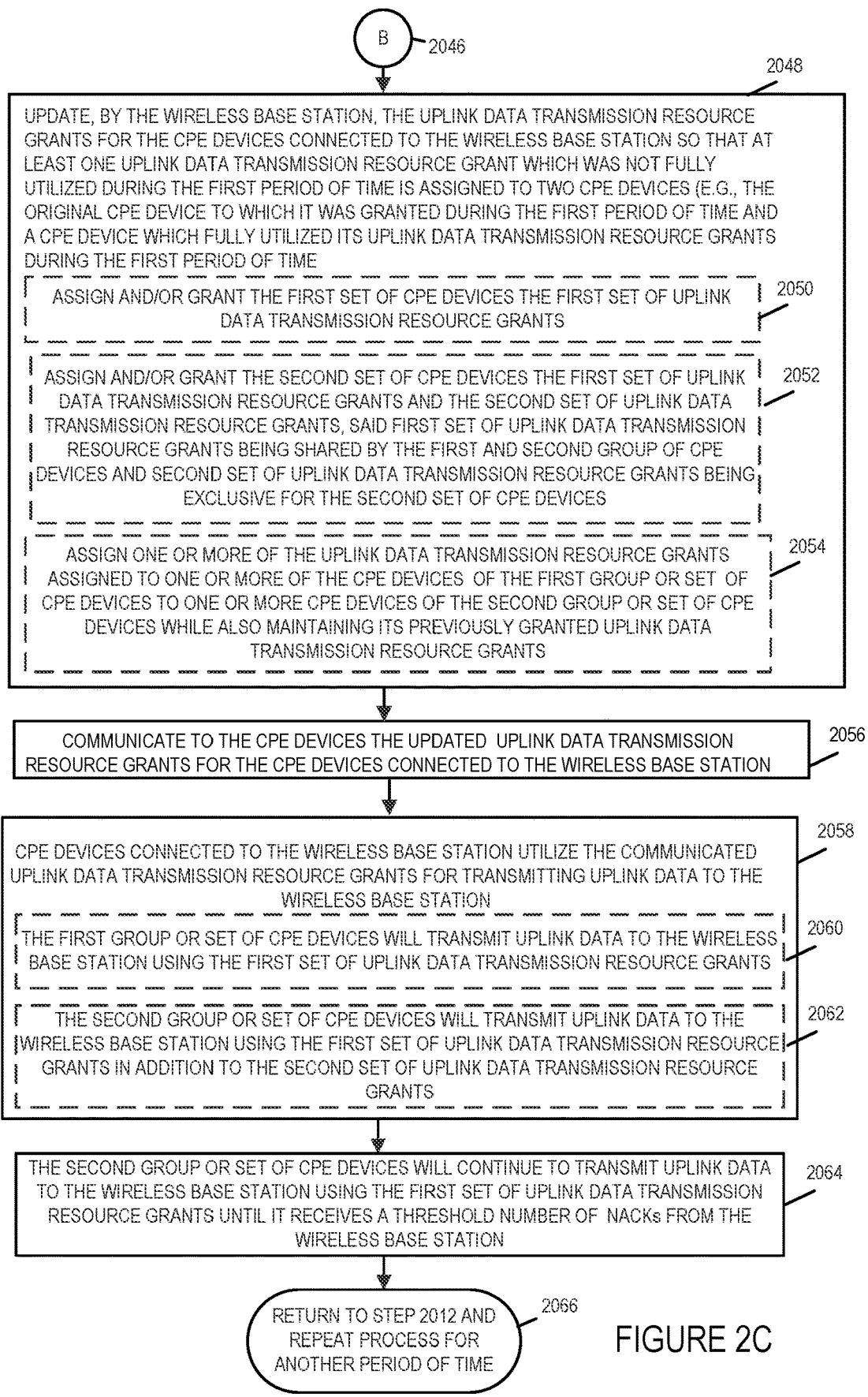
FIG. 2C illustrates the steps of the third part of an exemplary method in accordance with one embodiment of the present invention.

FIG. 2, which comprises the combination of FIGS. 2A, 2B, and 2C illustrates an exemplary method 2000. FIG. 2A illustrates the steps of the first part of an exemplary method 2000 in accordance with one embodiment of the present invention. FIG. 2B illustrates the steps of the second part of an exemplary method 2000 in accordance with one embodiment of the present invention. FIG. 2C illustrates the steps of the third part of an exemplary method 2000 in accordance with one embodiment of the present invention.

For explanatory purposes the exemplary method 2000 will be explained in connection with the exemplary communications system 100 illustrated in FIG. 1 although it should be understand that the method may be implemented using other systems and other system configurations then those illustrated in FIG. 1. While it will be readily understood that additional steps and signaling are performed in connection with communicating information, messages, and packets between devices, the method 2000 focuses on and discusses the steps and signaling for understanding the invention.

The method 2000 shown in FIG. 2 will now be discussed in detail. The method starts in start step 2002 shown on FIG. 2A with the devices in system 100 being initialized and becoming operational. Operation proceeds from step 2002 to step 2004.

In step 2004, a wireless base station, e.g., CBSD 1 102 of system 100, registers with a spectrum access system, e.g., SAS 1 110, and obtains frequency spectrum in 3.5 GHz bandwidth to use for communicating with devices in a first wireless protocol format, e.g., a 5G wireless protocol format, CBRS wireless protocol packet format, or a cellular wireless protocol format. Operation proceeds from step 2004 to step 2006.

In step 2006, wireless connections are established between a plurality of customer premises equipment devices (CPE) devices and the wireless base station, e.g., CPE device 1 112, CPE device 2 152, . . . , CPE device X 158 establish wireless connections with wireless base station 102 in system 100. Operation proceeds from step 2006 to step 2008.

In step 2008, the wireless base station (e.g., wireless base station 102) determines uplink data resource grants for each of the CPE devices connected to the wireless base station. The uplink data transmission resource grants for example identifying resource blocks, e.g., physical or logical resource blocks, that the CPE device is granted the right to use for transmitting uplink data from the CPE device to the wireless base station. The uplink data transmission resource grants are typically proactive grants that are fixed and which the CPE device is expected to use for transmitting its own uplink data at the time intervals specified by the grant using the resource blocks assigned to the CPE device by the wireless base station. Operation proceeds from step 2008 to step 2010.

In step 2010, the wireless base station (e.g., wireless base station 102) communicates to each of the plurality of CPE devices connected to the wireless base station the uplink data transmission resource grants, e.g., resource blocks, determined for the CPE device. The uplink data transmission resource grants are communicated to the CPE devices in the downlink control information (DCI) transmitted to the CPE devices using the Physical Downlink Control Channel (PDCCH). Operation proceeds from step 2010 to step 2012.

In step 2012, during a first period of time the operations/sub-steps 2014, 2016, 2018, and 2020 are performed.

In sub-step 2014 each of the plurality of CPE devices connected to the wireless base station determines if the CPE device has uplink data to transmit. Operation proceeds from sub-step 2014 to sub-steps 2016 and 2018.

In sub-step 2016, each CPE device determined to have uplink data to transmit to the wireless base station transmits the uplink data to the wireless base station using the uplink data transmission resource grants (e.g., granted right to use uplink resource blocks assigned to the CPE device) communicated to the CPE device.

In sub-step 2018, each CPE device which determined it does not have uplink data to transmit to the wireless base station skips the opportunity to transmit uplink data to the wireless base station leaving the uplink data transmission resource grants communicated to the CPE device unused (e.g., the resource blocks granted to the CPE device are not used).

Operation proceeds from sub-step 2016 and sub-step 2018 to sub-step 2020. In sub-step 2020, the wireless base station determines and/or counts the number of skipped uplink transmission opportunities by each of the CPE devices connected to the wireless base station for the first period of time. Operation proceeds from sub-step step 2020 back to sub-step 2014 where the process repeats for the duration of the first period of time. Operation proceeds from step 2012 to step 2022 when the sub-step 2020 is completed for first period of time.

In step 2022, the wireless base station determines an uplink resource utilization rate for each uplink data transmission for the first time period. Operation proceeds from step 2022 via connection node A 2024 to step 2026 shown on FIG. 2B.

In step 2026, the wireless base station determines whether uplink data transmission resources are utilized by the CPE devices connected to the wireless base station more than a first threshold value for the first period of time. In some embodiments the first threshold value is one of the following values 50%, 70% or 80%. It should be understood that these values are only exemplary and other threshold values may be used.

In step 2028, when the uplink data transmission resources are determined to be utilized by the CPE devices more than the first threshold value, the wireless base station keeps or maintains the current uplink resource grant schedule for the CPE devices connected to the wireless base station. Operation proceeds from step 2028 to step 2030. In step 2030, the method returns to step 2012 and the process is repeated for another or an additional period of time.

In step 2032, when the uplink data transmission resources are determined to not be utilized by the CPE devices more than the first threshold value the following operations/sub-steps 2034 and 2040 are performed. In step 2034, the wireless base station determines which CPE devices do not fully utilize the uplink data transmission resource grants granted to the CPE devices for use during the first period of time. In some embodiments, sub-step 2034 includes sub-steps 2036 and 2038. In sub-step 2036, the first wireless base station determines a first group or set of CPE devices which do not fully utilize the uplink data transmission resources granted to the CPE devices, e.g., the group or set of CPE devices which skipped an opportunity for uplink transmission. In some embodiments, sub-step 2036 is performed in sub-step 2018 and stored in memory which is then retrieved in sub-step 2036. In sub-step 2038, the wireless base station determines which uplink data transmission resource grants have been granted to the first group or set of CPE devices, said determined uplink data transmission resource grants for first group or set of CPE devices being a first set of data transmission resource grants.

In sub-step 2040, the wireless base station determines which CPE devices do fully utilize the uplink data transmission resources granted to the CPE devices. In some embodiments, sub-step 2040 is performed as part of step 2016 with the information stored in memory and then retrieved at sub-step 2040 in the process. In sub-step 2044, the wireless base station determines which uplink data transmission resource grants have been granted to the second group or set of CPE devices for use during the first period of time. The determined uplink data transmission resource grants for the second group or set of CPE devices being a second set of data transmission resource grants. Operation proceeds from step 2032 via connection node B 2046 to step 2048 shown on FIG. 2C.

In step 2048, the wireless base station updates the uplink data transmission resource grants for the CPE devices connected and/or attached to the wireless base station so that at least one uplink data transmission resource grant which was not fully utilized during the first period of time is assigned to two CPE devices becoming a shared uplink data transmission resource grant. For example, the shared resource grant is granted to both the original CPE device to which the uplink data transmission resource grant was assigned/granted during the first period of time and a CPE device which fully utilized its uplink data transmission resource grants during the first period of time. In some embodiments step 2048 includes one or more sub-steps 2050, 2052, and 2054.

In sub-step 2050, the wireless base station assigns and/or grants the first set of CPE devices the first set of uplink data transmission resource grants.

In sub-step 2052, the wireless base station assigns and/or grants the second set of CPE devices the first set of uplink data transmission resource grants. The first set of uplink data transmission resource grants being shared by the first and second group or set of CPE devices. In some such embodiments, each uplink data transmission resource grant is only shared by two CPE devices, one CPE device from the first group or set of CPE devices and one CPE device from the second group or set of CPE devices. The second set of uplink data transmission resource grants are exclusively used by the second set of CPE devices. In some embodiments, each uplink data transmission resource grant is assigned/granted to a single CPE device.

In sub-step 2054, the wireless base station assigns one or more of the uplink data transmission resource grants assigned to one or more of the CPE devices of the first group or set of CPE devices to one or more CPE devices of the second group or set of CPE devices while also maintaining its previously granted uplink data transmission resource grants.

Operation proceeds from step 2048 to step 2056. In step 2056, the wireless base station communicates the CPE devices connected and/or attached to the wireless base station the updated data transmission resource grants for the CPE devices connected and/or attached to the wireless base station. Operation proceeds from step 2056 to step 2058.

In step 2058 the CPE devices connected to the wireless base station after receiving the updated data transmission resource grants utilize the communicated uplink data transmission resource grants for transmitting uplink data to the wireless base station. That is each CPE device uses the updated grants assigned to the CPE device for transmitting uplink data to wireless base station. In some embodiments step 2058 includes one or more sub-steps 2060 and 2062.

In sub-step 2060, the first group or set of CPE devices transmit uplink data to the wireless base station using the first set of uplink data transmission resource grants. The second group or set of CPE devices transmit uplink data to the wireless base station using the first set of uplink data transmission grants in addition to the second set of uplink data transmission resource grants. The wireless base station receives the uplink data transmission from the CPE devices. When the wireless base station receives an uplink data transmission on an uplink data resource which is shared by two CPE devices it determines the sending CPE device by determining which CPE device has signed the uplink data transmission.

Operation proceeds from step 2058 to step 2064. In step 2064, the second group or set of CPE devices will continue to transmit uplink data to the wireless base station using the first set of uplink data transmission resource grants as long as the CPE device does not receive a plurality of NACKs from the wireless base station. Repeated or successive NACKs from the wireless base station can and will occur when both CPE devices attempt to utilize the same uplink data transmission resource grants. In such cases, when the CPE device detects a threshold number of NACKs on a granted uplink data transmission resource it will stop or decrease the number of attempts to use that granted uplink data transmission resource.

Operation proceeds from step 2064 to step 2066. In step 2066, the method returns to step 2012 and the process is repeated for another period of time.

In some embodiments, in which the wireless base station, e.g., CBSD 1 102, supports both wireless CPE devices, e.g., CBRS CPE devices 112, 152, 158, and regular user equipment devices, e.g., CBRS UE B1 103 and CBRS UE BZ 105, the wireless base station determines whether each of the connected and/or attached wireless devices is a CPE device or a user equipment device. The wireless base station then treats the CPE devices and user equipment devices differently. With the above described steps of method 2000 being implemented for the CPE devices but not for the user equipment devices. The wireless base station may, and in some embodiments, does determine whether the connected and/or attached device is a CPE device based on a CPE identification signal received from the CPE device during the connection or attachment process.

Figure 11:
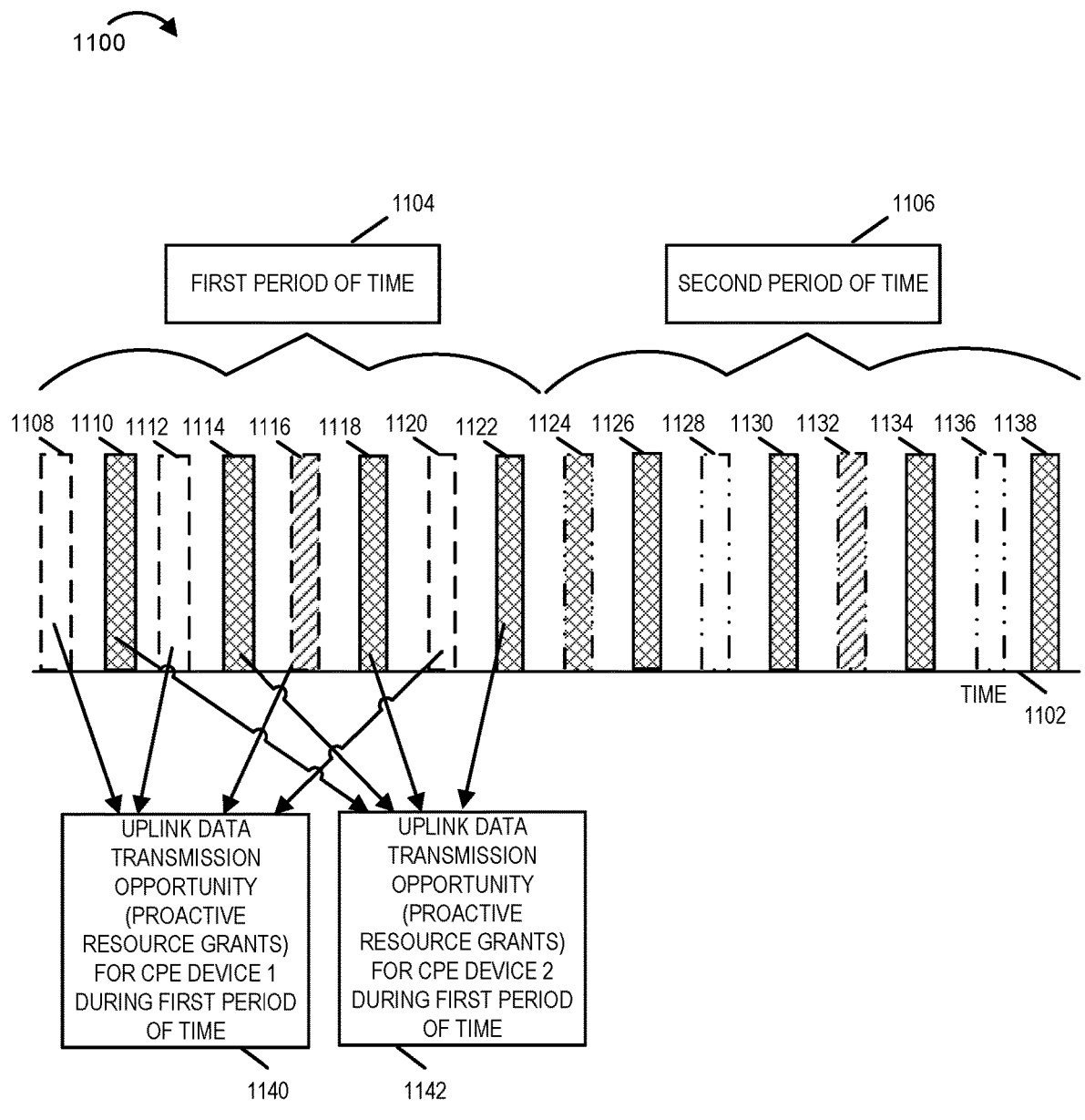
FIG. 11 illustrates the assignment and usage of uplink data transmission resource grants by CPE devices for a first and second period of time.

An example of the method 2000 simplified to using two CPE devices, CPE device 1 and CPE device 2, for explanatory purposes will now be discussed. Diagram 1100 of FIG. 11 illustrates the granting and usage of uplink data transmission resources to CPE device 1 and CPE device 2 as will be explained in greater detail below. Diagram 1100 shows a time line 1102 which increases in time from left to right. The CPE devices 1 and 2 which may be, and in some embodiments are CBRS CPE devices connect to the same wireless base station, e.g., a CBSD. The wireless base station having registered with a resource allocation system, e.g., a Spectrum Access System, and having been granted resources, e.g., spectrum, to use for communications with CPE devices within its coverage area. The wireless base station determines uplink data transmission resource grants for CPE device 1 and CPE device 2. The uplink data transmission resource grants include a first resource grant and a second resource grant. The first resource grant giving CPE device 1 the right to use a first set of resource blocks on a recurring basis to transmit uplink data to the wireless base station. The second resource grant giving the CPE device 2 the right to use a second set of resource blocks on a recurring basis to transmit uplink data to the wireless base station. The first and second resource grants in some embodiments, are proactive resource grants, i.e., the grants are semi-persistent in that once a CPE device receives the resource grant the CPE device continues to use resource grant until it receives a new resource grant schedule. Once the wireless base station has determined the uplink data transmission resource grants for CPE device 1 and CPE device 2, the wireless base station communicates the determined uplink data transmission resource grants to the CPE device 1 and CPE device 2 in the downlink control information (DCI) transmitted to the CPE device 1 and CPE device over the Physical Shared Downlink Control Channel (PSDCH). The CPE device 1 receives the downlink control information sent to CPE device 1 from the wireless base station which includes information from which the uplink data transmission resource grants can be derived or generated. The CPE device 2 receives the downlink control information from the wireless base station which includes information from which the uplink data transmission resource grants can be derived or generated. The CPE device 1 uses the downlink control information to derive or generate the uplink data transmission grant schedule for the CPE device 1, i.e., the first set of resource blocks, e.g., physical or virtual resource blocks and the recurring basis, schedule or time interval on which the set of resource blocks recur. The CPE device 2 uses the downlink control information to derive or generate the uplink data transmission grant schedule for the CPE device 2, i.e., the second set of resource blocks, e.g., physical or virtual resource blocks and the recurring basis, schedule or time interval on which the set of resource blocks recur. The uplink data transmission resource grant in this example being a set of recurring resource blocks in the physical uplink shared channel (PUSCH).

Diagram 1100 of FIG. 11 illustrates the uplink data transmission resource grant and usages for CPE device 1 and CPE device 2 during a first period of time 1104 and a second period of time 1106.

Diagram 1100 of FIG. 11, illustrates the uplink data transmission resource grant determined for CPE device 1 for the first period of time 1104 as including a first set of resource blocks represented as 1108. The first set of resource blocks recur as shown on the time line 1102 as resource blocks 1112, 1116, and 1120 during the first time period 1104. Each of the recurring first set of resource blocks 1108, 1112, 1116, and 1120 provide an opportunity for the CPE device 1 to transmit uplink data from the CPE device 1 to the wireless base station. Each recurrence of the first set of resource blocks (1108, 1112, 1116, and 1120) are referred to as an uplink data transmission opportunity as they are an opportunity to transmit uplink data from the CPE device 1 to the wireless base station over the uplink channel at the time of each recurrence using the resource blocks of the CPE device 1 uplink data transmission resource grant as described in the label box 1140. While only a single rectangle is shown, each rectangle represents a set of one or more resource blocks. Typically, a plurality of resource blocks are included in the set.

Diagram 1100 of FIG. 11, also illustrates the uplink data transmission resource grant determined for CPE device 2 for the first period of time 1104 as including a second set of resource blocks represented as 1110. The second set of resource blocks recur as shown on the time line 1102 as resource blocks 1114, 1118, and 1122 during the first time period 1104. Each of the recurring second set of resource blocks 1110, 1114, 1118, and 1122 provide an opportunity for the CPE device 2 to transmit uplink data from the CPE device 2 to the wireless base station. Each recurrence of the second set of resource blocks (1110, 1114, 1118, and 1122) are referred to as an uplink data transmission opportunity as they are an opportunity to transmit uplink data from the CPE device 2 to the wireless base station over the uplink channel at the time of each recurrence using the resource blocks of the CPE device 2 uplink data transmission resource grant as described in the label box 1140. While only a single rectangle is shown, each rectangle represents a set of one or more resource blocks. Typically, a plurality of resource blocks are included in the set.

The wireless base station having communicated the uplink data transmission resource grants to the CPE device 1 and CPE device 2 monitors the use of the resource blocks granted to the CPE device 1 and CPE device 2 during the first period of time 1104.

After the CPE device 1 and CPE device 2 receive the uplink data transmission resource grants, the CPE device 1 and CPE device 2 begin to use their respective uplink data transmission resource grants to transmit data to the wireless base station.

The CPE device 1 determines before the first uplink data transmission opportunity for the CPE device 1 in the first period of time whether it has uplink data to be transmitted to the wireless base station. The CPE device 1 in the example shown in diagram 1100 determines that it does not have data to be transmitted during the first uplink data transmission opportunity for the CPE device 1 in the first period of time and as shown in the FIG. 11 skips and does not use the first set of resources blocks 1108 to transmit uplink data to the wireless base station. The CPE device 1 determines before the second uplink data transmission opportunity for the CPE device 1 in the first period of time whether it has uplink data to be transmitted to the wireless base station. The CPE device 1 in the example shown in diagram 1100 determines that it does not have data to be transmitted during the second uplink data transmission opportunity for the CPE device 1 in the first period of time and as shown in the FIG. 11 skips and does not use the first set of resources blocks 1112 to transmit uplink data to the wireless base station. The CPE device 1 in the example shown in diagram 1100 determines that it has data to be transmitted during the third uplink data transmission opportunity for the CPE device 1 in the first period of time and as shown in the FIG. 11 fully utilizes the first set of resources blocks 1116 to transmit uplink data to the wireless base station. The CPE device 1 in the example shown in diagram 1100 determines that it does not have data to be transmitted during the fourth uplink data transmission opportunity for the CPE device 1 in the first period of time and as shown in the FIG. 11 skips and does not utilize the first set of resources blocks 1120 to transmit uplink data to the wireless base station.

The CPE device 2 determines before the first uplink data transmission opportunity for the CPE device 2 in the first period of time whether it has uplink data to be transmitted to the wireless base station. The CPE device 2 in the example shown in diagram 1100 determines that it has data to be transmitted during the first uplink data transmission opportunity for the CPE device 2 in the first period of time and as shown in FIG. 11 fully utilizes the second set of resources blocks 1110 to transmit uplink data to the wireless base station. The CPE device 2 determines before the second uplink data transmission opportunity for the CPE device 2 in the first period of time whether it has uplink data to be transmitted to the wireless base station. The CPE device 2 in the example shown in diagram 1100 determines that it has data to be transmitted during the second uplink data transmission opportunity for the CPE device 2 in the first period of time and as shown in the FIG. 11 fully utilizes the second set of resources blocks 1114 to transmit uplink data to the wireless base station. The CPE device 2 in the example shown in diagram 1100 determines that it has data to be transmitted during the third uplink data transmission opportunity for the CPE device 2 in the first period of time and as shown in the FIG. 11 fully utilizes the second set of resources blocks 1118 to transmit uplink data to the wireless base station. The CPE device 2 in the example shown in diagram 1100 determines that it has data to be transmitted during the four uplink data transmission opportunities for the CPE device 2 in the first period of time and as shown in the FIG. 11 fully utilizes the second set of resources blocks 1122 to transmit uplink data to the wireless base station.

As previously discussed, the wireless base station monitors the use of resource blocks granted to CPE device 1 and CPE device 2 during the first period of time 1140. This monitoring includes determining and/or counting the number of skipped or unused uplink data transmission opportunities by CPE device 1 and CPE device 2 for the first period of time 1104. As shown in FIG. 11, CPE device 1 skipped three out of four uplink data transmission opportunities and CPE device 2 skipped zero out of four uplink data transmission opportunities and using all resources blocks in each of the four uplink data transmission opportunities. After the first period of time has ended, the wireless base station determines CPE device 1 uplink data transmission resource utilization to be 25%, i.e., 3 out of 4 uplink data transmission opportunities were skipped and 1 uplink data transmission opportunity was used with all resource blocks being entirely filled. That is 75% of the uplink data resources granted to CPE device 1 was wasted and not used and 25% of the uplink data transmission resources were used by CPE device 1 during the first period of time. After the first period of time has ended, the wireless base station determines CPE device 2 uplink data transmission resource utilization to be 100%, i.e., no uplink data transmission opportunities were skipped and all resource blocks in the second set of resources was utilized by the CPE device 2 to transmit uplink data to the wireless base station for each of the four uplink data transmission opportunities during the first period of time.

The wireless base station determines whether the granted uplink data transmission resources have been utilized by the CPE devices more than a first threshold value for the first period of time. The first threshold value being an uplink data transmission utilization threshold value. In this example, the first threshold value is 75%. The CPE device 1 which has an uplink data transmission resource utilization value of 25% for the first period of time is determined by the wireless base station to not have utilized its granted uplink data transmission resources more than the first threshold value for the first period of time which is 75%. The CPE device 2 which has an uplink data transmission resource utilization value of 100% for the first period of time is determined by the wireless base station to have utilized its granted uplink data transmission resources more than the first threshold value for the first period of time which is 75%.

The wireless base station having determined that CPE device 1 did not utilize the uplink data transmission resources granted to it more than the first threshold uplink data transmission resource utilization value determines which CPE devices did not fully utilize the uplink data transmission resources granted to the CPE device and assigns these devices to be included in a first group or set of CPE devices. In some embodiments including in this example, the wireless base station makes the determination based on which CPE devices' uplink data transmission resource utilization is less than or equal to the first threshold value. The wireless base station assigns the CPE device 1 to the first set of CPE devices. The wireless base station then determines the uplink data transmission resource grant for each of the CPE devices assigned to the first set or group of CPE devices. In this example, the first set of resource blocks was granted to the CPE device 1 and it included resource blocks 1, 3 and 4, e.g., physical or virtual resource blocks 1, 3 and 4.

In some embodiments, the wireless base station makes the determination of which CPE devices to include in the first set of CPE devices based on which CPE devices' uplink data transmission resource utilization is less than a second threshold value which is typically less than or equal to the first threshold value. For example, if the first threshold value is 75%, the second threshold value may be, and in some embodiments is set to 50%. Such embodiments provide additional flexibility in determining which CPE devices the wireless base station will target for uplink data transmission resource grant sharing. For example, while the decision to implement uplink data transmission resource sharing among CPE devices are set by a first resource utilization threshold, the CPE devices which will be impacted by the uplink data transmission resource sharing will be determined by a second threshold which can be adjusted based on statistical analysis of potential collisions to minimize collisions between competing CPE devices sharing uplink data transmission resources.

The wireless base station having determined that CPE device 1 did not utilize the uplink data transmission resources granted to it more than the first threshold uplink data transmission resource utilization value also determines which CPE devices did fully utilize the uplink data transmission resources granted to the CPE device and assigns these devices to be included in a second group or set of CPE devices. In this example, the wireless base station assigns the CPE device 2 to the second set of CPE devices as it fully utilized the uplink data transmission resources granted to it during the first period of time. The wireless base station then determines the uplink data transmission resource grant for each of the CPE devices assigned to the second set or group of CPE devices. In this example, the second set of resource blocks was granted to the CPE device 2 and it included resource blocks 2, 5 and 6, e.g., physical or virtual resource blocks 2, 5 and 6.

The wireless base station stores CPE device uplink resource utilization information, e.g., for the first period of time, in memory. In this example, the wireless base station stores first uplink resource utilization information about the utilization of the first set of resource blocks by the CPE device 1, e.g., for the first period of time, in memory. In some embodiments, the first resource utilization information indicates whether resource blocks granted to the CPE device 1 were used during the first period of time. In some embodiments, the first resource utilization information indicates when and/or which resource blocks granted to the CPE device 1 were used during the first period of time and/or the portion of the first set of resource blocks that were used during the first period of time. For example, whether the resource blocks granted to the CPE device 1 were fully used or only a portion were used to transmit data. This information may be, and in some embodiments is, indicated as a utilization portion or amount with a 1 or 100% indicating full utilization or a fraction or percentage indicating less than full utilization by the CPE device 1.

In this example, the wireless base station stores second resource uplink utilization information about the utilization of the second set of resource blocks by CPE device 2, e.g., for the first period of time in memory. In some embodiments, the first resource utilization information indicates whether resource blocks granted to the CPE device 1 were used during the first period of time. In some embodiments, the second resource utilization information indicates when and/or which resource blocks granted to the CPE device 2 were used during the first period of time and/or the portion of the second set of resource blocks that were used during the first period of time. For example, whether the resource blocks granted to the CPE device 2 were fully used or only a portion were used to transmit data. This information may be, and in some embodiments is, indicated as a utilization portion or amount with a 1 or 100% indicating full utilization or a fraction or percentage indicating less than full utilization by the CPE device 2.

The wireless base station makes an uplink data transmission resource sharing decision based on the stored resource utilization information (e.g., the first and second resource utilization information. The uplink data transmission resource sharing decision in this example is that the first set of resource blocks are to be shared by the CPE device 1 and CPE device 2 in a second period of time. The second period of time coming after the first period of time. The wireless base station generates a third uplink data transmission resource grant for the CPE device 2. The third uplink data transmission resource grant grants the CPE device 2 the right to use the first set of resource blocks (RB 1, RB 3, RB 4) on a recurring basis. The CPE device 1 and CPE device 2 will share the first set of resource blocks for uplink data transmission. The CPE device 2 will also still maintain the right to use the second set of resource blocks for uplink data transmissions on a recurring basis. In some embodiments in which more than the one CPE device is assigned to the first set of CPE devices and/or more than CPE device is assigned to the second set of CPE devices, the wireless base station will make decisions on which CPE devices in the first set of CPE devices will share their granted resource blocks with one or more CPE devices in the second set of CPE devices. The wireless base station communicates the third uplink data transmission resource grant to CPE device 2. Upon receiving the third uplink data transmission resource grant, the CPE device 2 will commence using both the first set of resource blocks and the second set of resource blocks to transmit uplink data to the wireless base station. In some embodiments, the wireless base station also instructs the CPE device 2 to transmit on the uplink data transmission opportunities for the first set of resource blocks randomly in order to decrease the probability of collisions when both the CPE device 1 and CPE device 2 attempt to transmit during the same uplink data transmission opportunity using the first set of resource blocks. The CPE device 2 in some embodiments performs statistical measurements to track when transmission on the first set of resource blocks results in receipt of an ACK (HARQ mechanism indicating successful reception of the CPE device 2 data by the wireless base station) and when transmission on the first set of resource blocks results in receipt of an NACK (HARQ mechanism indicating failure of reception of the CPE device 2 data by the wireless base station) to determine which uplink data transmission opportunities to transmit data to the wireless base station using the first set of resource blocks. In some embodiments, when the CPE device 2 uses the first set of resource blocks during an uplink data transmission opportunity and receives an ACK from the wireless base station the CPE device 2 will increase the number of uplink data transmission opportunities for the first set of resource blocks it will use until it receives a NACK from the wireless base station. When the CPE device 2 receives a NACK after using an uplink data transmission opportunity for the first set of resource blocks it will decrease the number of uplink data transmission opportunities it will transmit using the first set of resource blocks. In some embodiments, the CPE device 2 generates statistics on which recurring uplink data transmission opportunities for the first set of resource blocks it will transmit data on to minimize collisions with the CPE device 1 uplink data transmissions.

In some embodiments, the wireless base station generates updated uplink data transmission resource grants for the CPE devices connected to the wireless base station so that at least one uplink data transmission resource grant which was not fully utilized during the first period of time is assigned to two CPE devices (e.g., the original CPE device to which it was granted during the first period of time (CPE device 1) and a CPE device (e.g., CPE device 2) which fully utilized its uplink data transmission resource grant during the first period of time. In such embodiments, the updated uplink data transmission grants are then communicated to the CPE devices.

In some embodiments, the CPE device 2 is communicated the uplink data transmission resource grant of the CPE device 1 so that it can attempt to utilize the CPE device 1 uplink resource grants.

Figure 12:
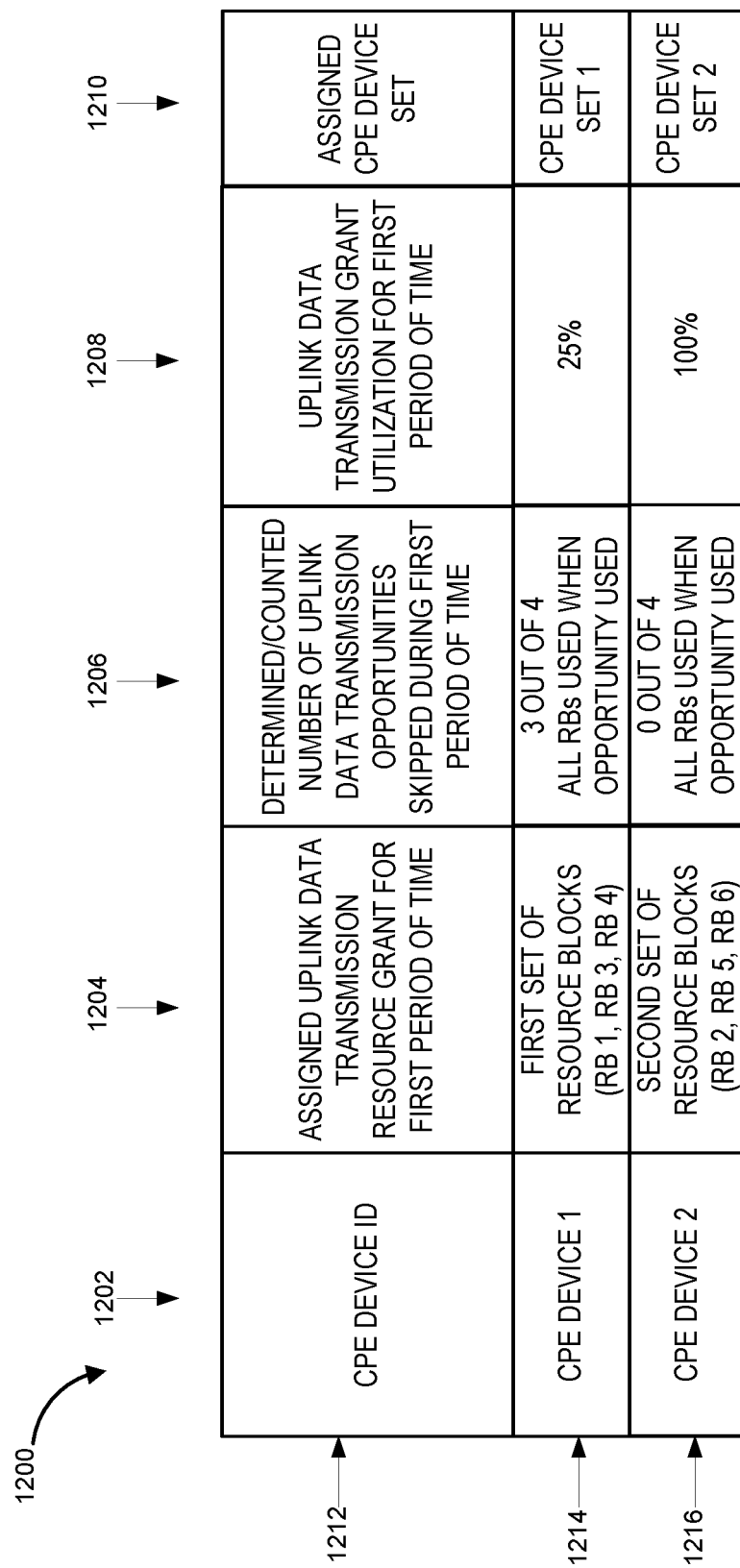
FIG. 12 illustrates an exemplary table including CPE device information, uplink data transmission resource grant information, and uplink data transmission grant resource utilization.

FIG. 12 illustrates an exemplary table 1200 which may be, and in some embodiments is, stored in memory or a storage device by the wireless base station. The table 1200 includes information about the CPE devices connected to the wireless base station during the first period of time including CPE device uplink resource utilization information. In this example, two CPE devices, CPE device 1 and CPE device 2, are connected to the wireless base station.

Table 1200 includes columns 1202, 1204, 1206, 1208, 1210 and rows 1212, 1214, and 1216. The first row 1212 includes labels identifying the information contained in the each of the columns. The entry (column 1202, row 1212) indicates that the entries in column 1202 includes CPE device IDs for CPE devices connected to the wireless base station. The entries in column 1204 identify the assigned uplink data transmission resource grant for the first time period (col. 1204, row 1212 entry) for the CPE device identified in the same row. The entries in column 1206 are the determined/counted number of uplink data transmission opportunities skipped during the first period of time (col. 1206, row 1212 entry) for the CPE device identified in the same row. The entries in column 1208 are the uplink data transmission grant utilization for the first period of time (col. 1208, row 1212 entry) for the CPE device identified in the same row. The entries in column 1210 are the assigned CPE device set (col. 1210, row 1212 entry) for the CPE device identified in the same row.

Row 1214 includes information for the CPE device 1 (col. 1202, row 1214 entry) that indicates: (i) the CPE device 1 was assigned the first set of resource blocks which included resource block (RB) 1, RB 3 and RB4 for its uplink data transmission resource grant for the first period of time (col. 1204, row 1214 entry), (ii) CPE device 1 skipped 3 out of 4 uplink data transmission opportunities during the first period of time and that all resource blocks where used during the non-skipped transmission opportunity (col. 1206, row 1214 entry), (iii) CPE device 1 uplink data transmission grant utilization for the first period of time was 25% (col. 1208, row 1214 entry); and (iv) CPE device 1 was assigned by the wireless base station to CPE device set 1 based on its uplink data transmission rate for the first period of time (col. 1210, row 1214 entry).

Row 1216 includes information for the CPE device 2 (col. 1202, row 1216 entry) that indicates: (i) the CPE device 2 was assigned the second set of resource blocks which included resource block (RB) 2, RB 5 and RB6 for its uplink data transmission resource grant for the first period of time (col. 1204, row 1216 entry), (ii) CPE device 1 skipped 0 out of 4 uplink data transmission opportunities during the first period of time and that all resource blocks were used during each uplink data transmission (col. 1206, row 1216 entry), (iii) CPE device 2 uplink data transmission grant utilization for the first period of time was 100% (col. 1208, row 1216 entry); and (iv) CPE device 2 was assigned by the wireless base station to CPE device set 2 based on its uplink data transmission rate for the first period of time (col. 1210, row 1216 entry).

Figure 13:
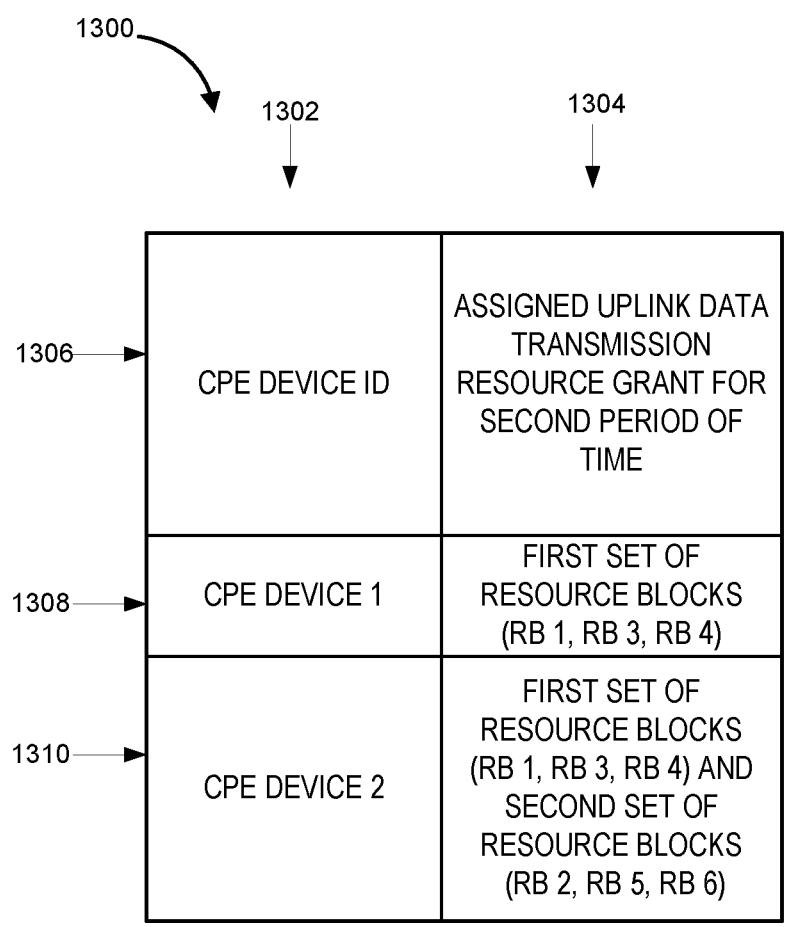
FIG. 13 illustrates an exemplary table of assignments of uplink data transmission resource grants per CPE device.

FIG. 13 illustrates an exemplary table 1300 which may be, and in some embodiments is, stored in memory or a storage device by the wireless base station. The table 1300 includes information about the CPE devices connected to the wireless base station during the second period of time including the assigned uplink data transmission resource grants for the second period of time. In this example, two CPE devices, CPE device 1 and CPE device 2, are connected to the wireless base station.

Table 1300 includes columns 1302 and 1304. The first row 1306 includes labels identifying the information contained in the each of the columns. The entry (column 1302, row 1306) indicates that the entries in column 1302 includes CPE device IDs for CPE devices connected to the wireless base station. The entries in column 1304 identify the assigned uplink data transmission resource grant for the second period of time (col. 1304, row 1306 entry) for the CPE device identified in the same row.

Row 1308 includes information for the CPE device 1 (col. 1302, row 1308 entry) that indicates the CPE device 1 was assigned the first set of resource blocks which included resource block (RB) 1, RB 3 and RB4 for its uplink data transmission resource grant for the second period of time (col. 1304, row 1308 entry).

Row 1308 includes information for the CPE device 2 (col. 1302, row 1310 entry) that indicates the CPE device 2 was assigned the first set of resource blocks (RB 1, RB 3, RB4) and the second set of resource block RB 2, RB 5 and RB6 for its uplink data transmission resource grant for the second period of time (col. 1304, row 1310 entry).

Diagram 1100 of FIG. 11, illustrates the uplink data transmission resource grant determined for CPE device 2 for the second period of time as including the first set of resource blocks represented as 1124 which is shared with the CPE device 1 and second set of resource blocks represented as 1126 which is not shared with CPE device 1. The first set of resource blocks which is the shared set of resource blocks recur as shown on the time line 1102 as resource blocks 1128, 1132, and 1136 during the second period of time 1106. The second set of resource blocks 1126 recur as shown on the time line 1102 as resource blocks 1126, 1130, 1134, and 1138. Each of the recurring second set of resource blocks 1126, 1130, 1134, and 1138 provide an opportunity for the CPE device 2 to transmit uplink data from the CPE device 2 to the wireless base station. Each recurrence of the second set of resource blocks (1126, 1130, 1134, and 1138) are referred to as an uplink data transmission opportunity.

FIG. 11 also illustrates the usage of the resource blocks 1124, 1126, 1128, 1130, 1132, 1134, 1136, and 1138 during the set period of time. CPE device 2 uses the first set of resource blocks 1124 to transmit uplink data to the wireless base station. CPE device 2 uses the second set of resource blocks 1126 to transmit uplink data to the wireless base station. The first set of resource blocks 1128 which is a shared set of resource blocks is skipped or left empty as neither the CPE device 1 or CPE device 2 use this uplink data transmission opportunity to transmit uplink data to the wireless base station. The second set of resource blocks 1130 are used by CPE device 2 to transmit uplink data to the wireless base station. CPE device 1 uses the first set of resource blocks 1132 to transmit uplink data to the wireless base station. CPE device 2 uses the second set of resource blocks 1134 to transmit uplink data to the wireless base station. The first set of resource blocks 1136 which is a shared set of resource blocks is skipped or left empty as neither the CPE device 1 or CPE device 2 use this uplink data transmission opportunity to transmit uplink data to the wireless base station. CPE device uses the second set of resource blocks 1138 to transmit uplink data to the wireless base station. As can be seen from diagram 1100, the use of shared resource grants has increased the efficiency and utilization of the uplink data transmission resources. The CPE device 2 in the example did not attempt to utilize all of the uplink data transmission opportunities corresponding to the recurrence of the first set of resource blocks as this would have resulted in collisions with the CPE device 1 during the CPE 1 device transmission corresponding to the 1132 first set of resource blocks. Instead the CPE device 2 in this example randomly choose one recurrence of the first set of resource blocks to use. The CPE device may, and in some embodiments does, generate and use statistics based on monitoring of ACKs and NACKs in response to data transmission to increase or decrease it use of the first set of resource blocks and/or which recurring data transmission opportunities to utilize. Legend 1144 provides information for understanding the usage of the resource blocks and how which CPE devices the set of resource blocks have been granted. Shape 1146 illustrates the shape representing a set of resource blocks granted to CPE device 1 and which has been skipped or left unused. Shape 1148 illustrates the shape representing a set of resource blocks granted to CPE device 1 and which has been fully filled with uplink data transmitted to the wireless base station from CPE device 1. Shape 1150 illustrates the shape representing a set of resource blocks granted to CPE device 2 and which has been skipped or left unused. Shape 1152 illustrates the shape representing a set of resource blocks granted to CPE device 2 and which has been fully filled with uplink data transmitted to the wireless base station from CPE device 2. Shape 1154 illustrates the shape representing a shared set of resource blocks granted to both the CPE device 1 and CPE device 2 which has been skipped or left unused by both CPE device 1 and CPE device 2. Shape 1156 illustrates the shape representing a shared set of resource blocks granted to both CPE device 1 and CPE device 2 and which has been fully filled with uplink data transmitted to the wireless base station from CPE device 1. Shape 1158 illustrates the shape representing a shared set of resource blocks granted to both CPE device 1 and CPE device 2 and which has been fully filled with uplink data transmitted to the wireless base station from CPE device 2.

While only a single set of resource blocks have been illustrated as being included in an uplink data transmission resource grant, in some embodiments a plurality of different sets of resource blocks are included in a uplink data transmission resource grant. In such embodiments, the wireless base station may, and in some embodiments, does determine separately for each of the plurality of sets of resource blocks the CPE device's utilization of the set of resource blocks. Furthermore, the wireless base station may then use this resource utilization information to determine whether one or more of the plurality of sets of resource blocks are to be used as a shared set of resource blocks by more than one CPE device.

In some embodiments, the wireless base station makes one or more uplink data transmission grants to each of the CPE devices connected to the wireless base station for use during a time period, e.g., a first or second time period. In at least some of such embodiments, the wireless base station monitors the utilization of each uplink data transmission grant for a period of time and stores the resource utilization information in memory. This resource utilization information can then be used to make a resource sharing decision, e.g., to determine whether one or more of the uplink data transmission resource grants assigned to a CPE device should be a shared resource grant assigned to multiple CPE devices.

Figure 14A:
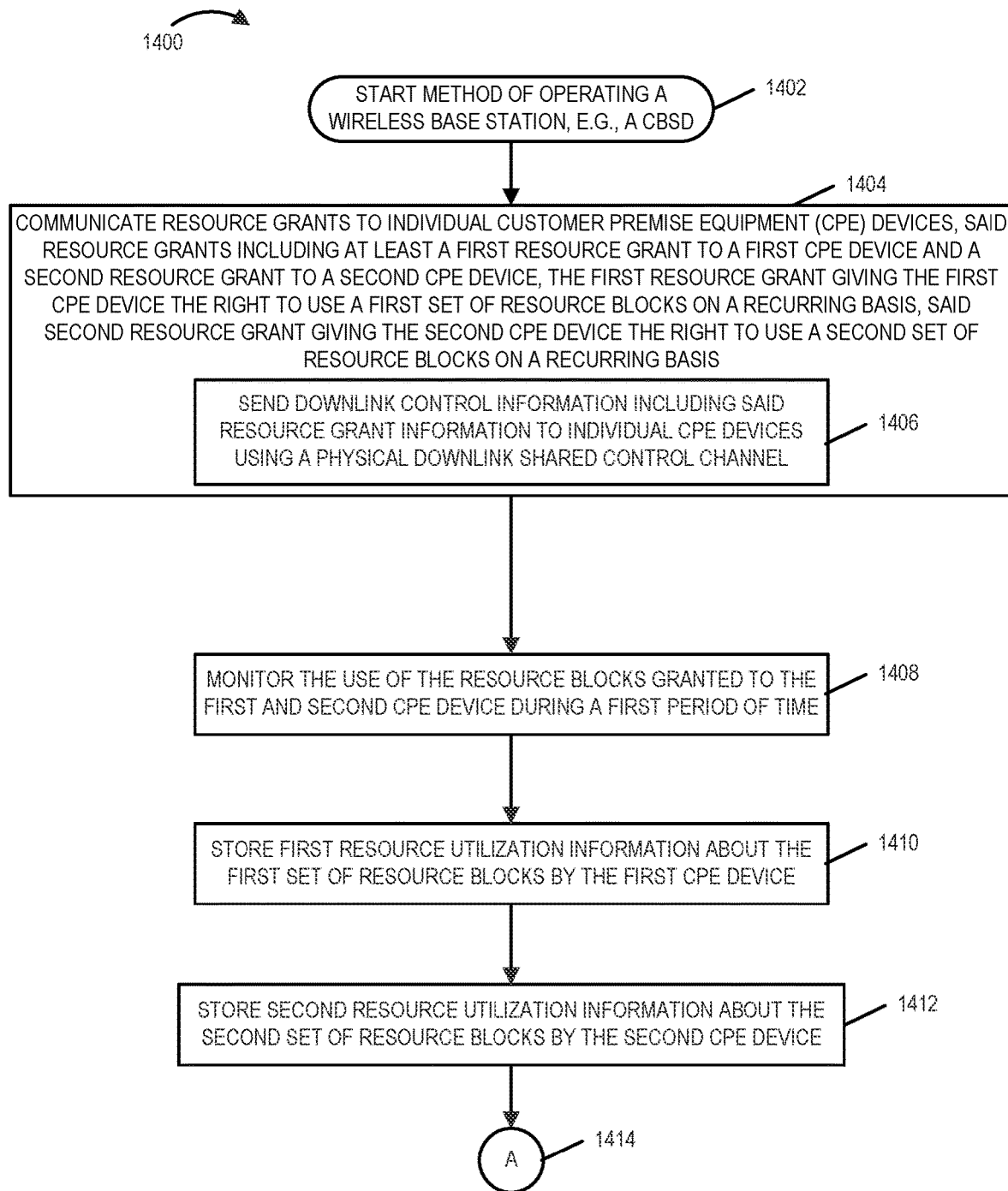
FIG. 14A illustrates the steps of the first part of an exemplary method in accordance with an embodiment of the present invention.
Figure 14B:
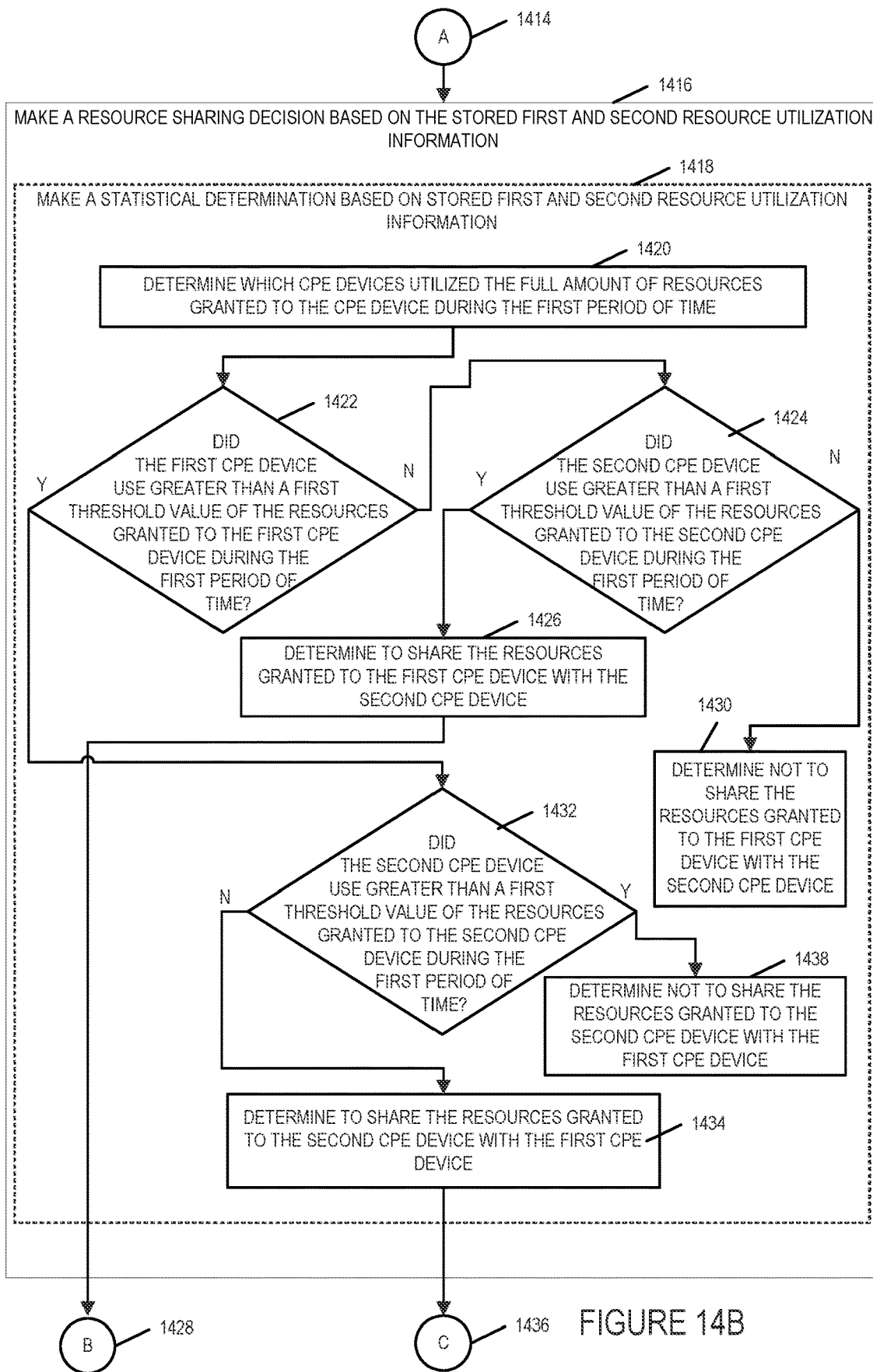
FIG. 14B illustrates the steps of the second part of an exemplary method in accordance with an embodiment of the present invention.

FIG. 14 illustrates the combination of FIGS. 14A, 14B, and 14C. FIG. 14A illustrates the steps of the first part of an exemplary method in accordance with an embodiment of the present invention. FIG. 14B illustrates the steps of the second part of an exemplary method in accordance with an embodiment of the present invention. FIG. 14C illustrates the steps of the third part of an exemplary method in accordance with an embodiment of the present invention. The exemplary method illustrated in FIG. 14 may be, and in some embodiments is, implemented using the exemplary system 100 illustrated in FIG. 1.

FIG. 14, is a flowchart 1400 of an exemplary method of operating a wireless base station, e.g. a Citizens Broadband Radio Service Device (CBSD), in accordance with an exemplary embodiment.

Operation starts in step 1402 shown on FIG. 14A. In step 1402, the wireless base station is powered on an initialized. Operation proceeds from start step 1402 to step 1404.

In step 1404 the base station communicates resources grants to individual customer premise equipment (CPE) devices, said resource grants including at least a first resource grant to a first CPE device and a second resource grant to a second CPE device, the first resource grant giving the first CPE device the right to use a first set of resource blocks on a recurring basis, said second resource grant giving the second CPE device the right to use a second set of resource blocks son a recurring basis.

In some embodiments, the wireless base station is a Citizens Broadband Radio Service device (CBSD) and the customer premises equipment devices are Citizens Broadband Radio Service customer premises equipment (CPE) devices.

In some embodiments, an individual customer premises equipment device provides services to one or more user equipment devices.

In some embodiments, the first set of resource blocks includes one or more resource blocks, and the second set of resource blocks includes one or more resource blocks which are different from the resource blocks in said first set of resource blocks. In some embodiments, the resource grants to individual customer premises equipment (CPE) devices are uplink data transmission resource grants.

Step 1404 includes step 1406 in which the base station sends downlink control information include said resource grant information to individual CPE devices using a physical downlink control channel. Operation proceeds from step 1404 to step 1408.

In step 1408 the base station monitors the use of the resource blocks granted to the first and second CPE devices during a first period of time. Operation proceeds from step 1408 to step 1410.

In step 1410 the base station stores first resource utilization information about the first set of resources blocks by the first CPE device. In some embodiments, the first resource utilization information indicates whether resource blocks granted to the first CPE device were used during the first period of time. In some such embodiments, the first resource utilization information indicates, when the resource blocks granted to the first CPE device were used during the first period of time, a portion or amount of the first set of resource blocks that were used during the first period of time (e.g., whether they were fully used or only a portion was used to transmit data—this information can be indicated as a utilization portion with a 1 indicating full utilization or a fraction indicating less than full utilization). Operation proceeds from step 1410 to step 1412.

In step 1412 the base station stores resource utilization information about the second set of resource blocks by the second CPE device. In some embodiments, the second resource utilization information indicates whether resource blocks granted to the second CPE device were used during the first period of time. In some such embodiments, the second resource utilization information indicates, when the resource blocks granted to the second CPE device were used during the first period of time, a portion or an amount of the first set of resource blocks that were used during the first period of time (e.g., whether they were fully used or only a portion was used to transmit data—this information can be indicated as a utilization portion with a 1 indicating full utilization or a fraction indicating less than full utilization). Operation proceeds from step 1412, via connecting node A 1414 to step 1416 shown on FIG. 14B.

In step 1416 the base station makes a resource sharing decision based on the stored first and second resource utilization information. In some embodiments, the resource sharing decision of step 1416 is based on statistical analysis of usage of the first and second resource grants by the first CPE device and the second CPE device. Step 1416 includes step 1418, in which the base station makes a statistical determination based on stored first and second resource utilization information. Step 1418 includes steps 1420, 1422, 1426, 1430, 1432, 1434 and 1436.

In step 1420 the base station determines which CPE devices utilized the full amount of resources granted to the CPE devices during the first period of time. Operation proceeds from step 1420 to step 1422.

In step 1422, the base station determines if the first CPE device used greater than a first threshold value of the resources granted to the first CPE device during the first period of time. If the determination is that the first CPE device did not use greater than a first threshold value of the resources granted to the first CPE device during the first period of time, then operation proceeds from step 1422 to step 1424; otherwise, operation proceeds from step 1422 to step 1432.

In step 1424, the base station determines if the second CPE device used greater than a first threshold value of the resources granted to the second CPE device during the first period of time. If the determination is that the second CPE device used greater than a first threshold value of the resources granted to the second CPE device during the first period of time, then operation proceeds from step 1424 to step 1426 in which the base station determines to share the resources granted to the first CPE device with the second CPE device; otherwise, operation proceeds from step 1424 to step 1430, in which the base station determines not to share the resources granted to the first CPE device with the second CPE device. In some embodiments, in which operation proceeds to step 1426, the second CPE device fully utilized the resources granted to the second CPE device during the first period of time.

Returning to step 1432, in step 1432 the base station determines if the second CPE device used greater than a first threshold value of the resources granted to the second CPE device during the first period of time. If the determination is that the second CPE device did not use greater than a first threshold value of the resources granted to the second CPE device during the first period of time, then operation proceeds from step 1432 to step 1434, in which the base station determines to share the resources granted to the second CPE device with the first CPE device; otherwise, operation proceeds from step 1432 to step 1438, in which the base station determines not to share the resources granted to the second CPE device with the first CPE device.

Returning to step 1426, operation proceeds from step 1426, via connecting node B 1428 to step 1440 shown on FIG. 14C, in which the base station transmits a third grant granting the second CPE device the right to use resources which are granted to another device, e.g., the first CPE device. In some such embodiments, said third resource grant grants the second CPE device the right to use said first set of resource blocks on a recurring basis during a second period of time; and said first CPE device and said second CPE device both have the right to use the first set of resource blocks during the second period of time; and said second CPE device continues to have the right to use the second set of resource blocks during the second period of time. In some such embodiments, said second CPE device does not utilize every recurrence of the first set of resource blocks to transmit data; and said second CPE device determines which recurrences of the first set of resources blocks to use for transmitting data based on a randomly generated probability value or a prior receipt of a NACK message in response to a transmission of data using the first set of resource blocks.

Returning to step 1434, operation proceeds from step 1434, via connecting node C 1436 to step 1442, in which the base station transmits a third grant granting the first CPE device the right to use resources which are granted to another device, e.g., the second CPE device.

In some embodiments, said third grant grants resources which are shared as part of said resource sharing decision based on no or low use of resources granted in said third grant during said first period of time. In some such embodiments, said low use of resources granted in said third grant during said first period of time includes the utilization of the resources in the third grant being less than a first threshold value.

Operation proceeds from step 1440 or step 1442 to step 1444. In step 1444 the base station monitors to receive transmitted data from the first CPE device and second CPE device. Step 1444 may include step 1446 or step 1447.

In step 1446 the base station fails to successfully receive data form the first CPE device and the second CPE device, e.g. because of the occurrence of data collision because the first CPE device and the device and the second CPE device both transmitted data using the first set of resource blocks at the same time. Operation proceeds from step 1446 to step 1448 in which the base station send a NACK message to the both the first CPE device and the second CPE device indicating that the wireless base station did not receive the transmitted data. In some embodiments, when said second CPE device receives said NACK message, the second CPE device decreases the number of recurrences it attempts to transmit data using the first set of resource blocks. Operation proceeds from step 1448 to step 1450.

In step 1447 the base station successfully receives data from at least one of the first and second CPE devices. Operation proceeds from step 1447 to step 1449, in which the base station sends an ACK message to the first and/or second CPE device(s) from which data was successfully received. In some embodiment, when the second CPE device receives an ACK message in response to data transmitted to the wireless base station using the first set of resource blocks, the second CPE device increases the frequency with which it transmits data to the wireless base station using the first set of resource blocks until it receives a NACK message in response to data transmitted to the wireless base station using the first set of resources blocks after which decreases the frequency with which it transmits data to the wireless base using the first set of resource blocks. Operation proceeds from step 1449 to step 1450.

In some embodiments, the second CPE devices monitors the ACK and NACK messages received from the wireless base station in response to data transmission attempts using the first set of resource blocks and adjusts the frequency of data transmission attempts using the first set of resource blocks to minimize collisions with data transmission form the first CPE device using the first set of resource blocks.

In step 1450 the base station generates from information obtained over the first period of time by the wireless base station, a customer premises equipment profile for each of the individual customer premises equipment devices connected to the wireless base station, each of said customer premises equipment device profiles includes a customer premises equipment device identifier which identifies the customer premises equipment device to which the customer premises device profile corresponds, the resource grants to the CPE device and the utilization of CPE resource grants during the first time period.

The various methods and apparatus described above including the method 2000 provide technological solutions of how a wireless base station can effectively and efficiently manage uplink data transmission grants, e.g., proactive grants, to wireless devices, e.g., CPE devices, in a wireless network thereby increasing uplink data transmission resource utilization. The various embodiments described in connection with method 2000 also provide new and novel methods for sharing uplink data transmission resource grants, e.g., proactive grants, in 5G/CBRS fixed wireless access systems including customer premises equipment devices and/or mobile terminals which support a number of subscribers. The methods and apparatus discussed above also provides new and/or improved methods for sharing uplink grant and data transmission information and resources among CPE devices through a wireless base station.

In some embodiments, the information in the tables 1200 and 1300 are stored in the memory of the wireless base station, e.g., non-volatile memory so that the information is not lost upon a power failure or a reset of the wireless base station.

Various exemplary embodiments illustrating different features of the present invention will now be discussed.

NUMBERED LIST OF EXEMPLARY METHOD EMBODIMENTS

Method Embodiment 1. A method of operating a wireless base station (e.g., CBSD), the method comprising: communicating resource grants to individual customer premise equipment (CPE) devices, said resource grants including at least a first resource grant to a first CPE device and a second resource grant to a second CPE device, the first resource grant giving the first CPE device the right to use a first set of resource blocks on a recurring basis, said second resource grant giving the second CPE device the right to use a second set of resource blocks on a recurring basis; monitoring the use of resource blocks granted to the first and second CPE devices during a first period of time; storing first resource utilization information about the utilization of said first set of resource blocks by said first CPE device; and storing second resource utilization information about the utilization of the second set of resource blocks by said second CPE device.

Method Embodiment 1A. The method of Method Embodiment 1, wherein the first set of resource blocks includes one or more resource blocks; and wherein the second set of resource blocks includes one or more resource blocks which are different from the resource blocks in said first set of resource blocks.

Method Embodiment 1AA. The method of Method Embodiment 1, wherein the first resource utilization information indicates whether resource blocks granted to the first CPE device were used during the first period of time.

Method Embodiment 1AAA. The method of Method Embodiment 1AA, wherein the first resource utilization information indicates, when the resource blocks granted to the first CPE device were used during the first period of time, a portion or amount of the first set of resource blocks that were used during the first period of time (e.g., whether they were fully used or only a portion was used to transmit data—this information can be indicated as a utilization portion with a 1 indicating full utilization or a fraction indicating less than full utilization).

Method Embodiment 1AAAA. The method of Method Embodiment 1AA, wherein the second resource utilization information indicates whether resource blocks granted to the second CPE device were used during the first period of time.

Method Embodiment 1AAAAA. The method of Method Embodiment 1AA, wherein the second resource utilization information indicates, when the resource blocks granted to the second CPE device were used during the first period of time, a portion or an amount of the first set of resource blocks that were used during the first period of time (e.g., whether they were fully used or only a portion was used to transmit data—this information can be indicated as a utilization portion with a 1 indicating full utilization or a fraction indicating less than full utilization).

Method Embodiment 2. The method of Method Embodiment 1, further comprising: making a resource sharing decision based on the stored first and second resource utilization information; and transmitting a third grant granting the second CPE device the right to use resources which are granted to another CPE device.

Method Embodiment 3. The method of Method Embodiment 2, wherein said third grant grants resources which are shared as part of said resource sharing decision based on no or low use of resources granted in said third grant during said first period of time.

Method Embodiment 3A. The method of Method Embodiment 3, wherein said low use of resources granted in said third grant during said first period of time includes the utilization of the resources in the third grant being less than a first threshold value.

Method Embodiment 3B. The method of Method Embodiment 3, wherein making said resource sharing decision based on the stored first and second resource utilization information including determining which CPE devices utilized the full amount of resources granted to the CPE device during the first period of time.

Method Embodiment 4. The method of Method Embodiment 3, wherein said resource sharing decision further includes determining whether the first CPE device used greater than a first threshold value of the resources granted to the first CPE device during the first period of time; wherein said resource sharing decision further includes determining whether the second CPE device used greater than a first threshold value of the resources granted to the second CPE device during the first period of time; and when said first CPE device is determined to not have used greater than a first threshold value of the resources granted to the first CPE device during the first period of time and the second CPE device is determined to have used greater than the first threshold value of the resources granted to the second CPE device during the first period of time determining to share the resources granted to the first CPE device with the second CPE device; and wherein said another CPE device is said first CPE device.

Method Embodiment 4A. The method of Method Embodiment 4, wherein said second CPE device fully utilized the resources granted to the second CPE device during the first period of time.

Method Embodiment 5. The method of Method Embodiment 3, wherein said resource sharing decision is based on statistical analysis of usage of the first and second resource grants by the first CPE device and second CPE device.

Method Embodiment 6. The method of Method Embodiment 1, wherein the resource grants to individual customer premise equipment (CPE) devices are uplink data transmission resource grants.

Method Embodiment 6A. The method of Method Embodiment 6, wherein said uplink data transmission resource grants are proactive resource grants.

Method Embodiment 7. The method of Method Embodiment 1, wherein communicating resource grants to individual customer premise equipment (CPE) devices includes sending downlink control information including said resource grant information to the individual CPE devices using a Physical Downlink Control Channel.

Method Embodiment 8. The method of Method Embodiment 3, wherein making a resource sharing decision based on the stored first and second resource utilization information includes making a statistical determination based on said stored first and second resource utilization information.

Method Embodiment 9. The method of Method Embodiment 3, wherein said third resource grant includes granting the second CPE device the right to use said first set of resource blocks on a recurring basis during a second period of time; and wherein said first CPE device and said second CPE device both have the right to use the first set of resource blocks during the second period of time; and wherein said second CPE device continues to have the right to use the second set of resource blocks during the second period of time.

Method Embodiment 10. The method of Method Embodiment 9, wherein said second CPE device does not utilize every recurrence of the first set of resource blocks to transmit data; and wherein said second CPE device determines which recurrences of the first set of resources blocks to use for transmitting data based on a randomly generated probability value or a prior receipt of a NACK message in response to a transmission of data using the first set of resource blocks.

Method Embodiment 11. The method of Method Embodiment 9, wherein when a data collision occurs because the first CPE device and the second CPE device both transmit data using the first set of resource blocks at the same time, the wireless base station sends a NACK message to both the first CPE device and the second CPE device indicating that the wireless base station did not receive the transmitted data; and when said second CPE device receives said NACK message, the second CPE device decreases the number of recurrences it attempts to transmit data using the first set of resource blocks.

Method Embodiment 12. The method of Method Embodiment 9, wherein when the second CPE device receives an ACK message in response to data transmitted to the wireless base station using the first set of resource blocks, the second CPE device increases the frequency with which it transmits data to the wireless base station using the first set of resource blocks until it receives a NACK message in response to data transmitted to the wireless base station using the first set of resources blocks after which decreases the frequency with which it transmits data to the wireless base using the first set of resource blocks.

Method Embodiment 13. The method of Method Embodiment 9, wherein the second CPE device monitors the ACK and NACK messages received from the wireless base station in response to data transmission attempts using the first set of resource blocks and adjusts the frequency of data transmission attempts using the first set of resource blocks to minimize collisions with data transmission from the first CPE device using the first set of resource blocks.

Method Embodiment 14. The method of Method Embodiment 1, wherein said wireless base station is a Citizens Broadband Radio Service Device; and wherein said customer premises equipment device is a Citizens Broadband Radio Service customer premises equipment device.

Method Embodiment 15. The method of Method Embodiment 1, wherein said individual customer premises equipment devices provides services to one or more user equipment devices.

Method Embodiment 16. The method of Method Embodiment 1, further comprising: generating from information obtained over the first period of time, by the wireless base station, a customer premises equipment device profile for each of the individual customer premises equipment devices connected to the wireless base station, each of said customer premises equipment device profiles including a customer premises equipment device identifier which identifies the customer premises equipment device to which the customer premises equipment device profile corresponds, the resource grants to the CPE device, and the utilization of the CPE device resource grants during the first period of time.

NUMBERED LIST OF EXEMPLARY SYSTEM EMBODIMENTS

System Embodiment 1. A wireless communications system comprising: a wireless base station, said wireless base station including: a memory; and a first processor, said first processor controlling the wireless base station to perform the following operations: communicating resource grants to individual customer premise equipment (CPE) devices, said resource grants including at least a first resource grant to a first CPE device and a second resource grant to a second CPE device, the first resource grant giving the first CPE device the right to use a first set of resource blocks on a recurring basis, said second resource grant giving the second CPE device the right to use a second set of resource blocks on a recurring basis; monitoring the use of resource blocks granted to the first and second CPE devices during a first period of time; storing first resource utilization information about the utilization of said first set of resource blocks by said first CPE device in said memory; and storing second resource utilization information about the utilization of the second set of resource blocks by said second CPE device in said memory.

System Embodiment 1A. The wireless communications system of System Embodiment 1, wherein the first set of resource blocks includes one or more resource blocks; and wherein the second set of resource blocks includes one or more resource blocks which are different from the resource blocks in said first set of resource blocks.

System Embodiment 1AA. The wireless communications system of System Embodiment 1, wherein the first resource utilization information indicates whether resource blocks granted to the first CPE device were used during the first period of time.

System Embodiment 1AAA. The wireless communications system of System Embodiment 1AA, wherein the first resource utilization information indicates, when the resource blocks granted to the first CPE device were used during the first period of time, a portion or amount of the first set of resource blocks that were used during the first period of time (e.g., whether they were fully used or only a portion was used to transmit data—this information can be indicated as a utilization portion with a 1 indicating full utilization or a fraction indicating less than full utilization).

System Embodiment 1AAAA. The wireless communications system of System Embodiment 1AA, wherein the second resource utilization information indicates whether resource blocks granted to the second CPE device were used during the first period of time.

System Embodiment 1AAAAA. The wireless communications system of System Embodiment 1AA, wherein the second resource utilization information indicates, when the resource blocks granted to the second CPE device were used during the first period of time, a portion or an amount of the first set of resource blocks that were used during the first period of time (e.g., whether they were fully used or only a portion was used to transmit data—this information can be indicated as a utilization portion with a 1 indicating full utilization or a fraction indicating less than full utilization).

System Embodiment 2. The wireless communications system of System Embodiment 1, wherein said first processor further controls the wireless base station to perform the following operations: making a resource sharing decision based on the stored first and second resource utilization information; and transmitting a third grant granting the second CPE device the right to use resources which are granted to another CPE device.

System Embodiment 3. The wireless communications system of System Embodiment 2, wherein said third grant grants resources which are shared as part of said resource sharing decision based on no or low use of resources granted in said third grant during said first period of time.

System Embodiment 3A. The wireless communications system of System Embodiment 3, wherein said low use of resources granted in said third grant during said first period of time includes the utilization of the resources in the third grant being less than a first threshold value.

System Embodiment 3B. The wireless communications system of System Embodiment 3, wherein said making said resource sharing decision based on the stored first and second resource utilization information including determining which CPE devices utilized the full amount of resources granted to the CPE device during the first period of time.

System Embodiment 4. The wireless communications system of System Embodiment 3, wherein said resource sharing decision further includes determining whether the first CPE device used greater than a first threshold value of the resources granted to the first CPE device during the first period of time; wherein said resource sharing decision further includes determining whether the second CPE device used greater than a first threshold value of the resources granted to the second CPE device during the first period of time; and when said first CPE device is determined to not have used greater than a first threshold value of the resources granted to the first CPE device during the first period of time and the second CPE device is determined to have used greater than the first threshold value of the resources granted to the second CPE device during the first period of time determining to share the resources granted to the first CPE device with the second CPE device; and wherein said another CPE device is said first CPE device.

System Embodiment 4A. The wireless communications system of System Embodiment 4, wherein said second CPE device fully utilized the resources granted to the second CPE device during the first period of time.

System Embodiment 5. The wireless communications system of System Embodiment 3, wherein said resource sharing decision is based on statistical analysis of usage of the first and second resource grants by the first CPE device and second CPE device.

System Embodiment 6. The wireless communications system of System Embodiment 1, wherein the resource grants to individual customer premise equipment (CPE) devices are uplink data transmission resource grants.

System Embodiment 6A. The wireless communications system of System Embodiment 6, wherein said uplink data transmission resource grants are proactive resource grants.

System Embodiment 7. The wireless communications system of System Embodiment 1, wherein communicating resource grants to individual customer premise equipment (CPE) devices includes sending downlink control information including said resource grant information to the individual CPE devices using a Physical Downlink Control Channel.

System Embodiment 8. The wireless communications system of System Embodiment 3, wherein making a resource sharing decision based on the stored first and second resource utilization information includes making a statistical determination based on said stored first and second resource utilization information.

System Embodiment 9. The wireless communications system of System Embodiment 3, wherein said third resource grant includes granting the second CPE device the right to use said first set of resource blocks on a recurring basis during a second period of time; and wherein said first CPE device and said second CPE device both have the right to use the first set of resource blocks during the second period of time; and wherein said second CPE device continues to have the right to use the second set of resource blocks during the second period of time.

System Embodiment 10. The wireless communications system of System Embodiment 9, further comprising: said second CPE device including a second processor; and wherein said second CPE device does not utilize every recurrence of the first set of resource blocks to transmit data; and wherein said second processor controls said second CPE device to determine which recurrences of the first set of resources blocks to use for transmitting data based on a randomly generated probability value or a prior receipt of a NACK message in response to a transmission of data using the first set of resource blocks.

System Embodiment 11. The wireless communications system of system embodiment 9, further comprising: said second CPE device including a second processor; and wherein when a data collision occurs because the first CPE device and the second CPE device both transmit data using the first set of resource blocks at the same time, the wireless base station sends a NACK message to both the first CPE device and the second CPE device indicating that the wireless base station did not receive the transmitted data; and when said second CPE device receives said NACK message, said second processor controls the second CPE device to decrease the number of recurrences it attempts to transmit data using the first set of resource blocks.

System Embodiment 12. The wireless communications system of System Embodiment 9, further comprising: said second CPE device including a second processor; and wherein when the second CPE device receives an ACK message in response to data transmitted to the wireless base station using the first set of resource blocks, the second processor controls the second CPE device increase the frequency with which it transmits data to the wireless base station using the first set of resource blocks until it receives a NACK message in response to data transmitted to the wireless base station using the first set of resources blocks after which decreases the frequency with which it transmits data to the wireless base using the first set of resource blocks.

System Embodiment 13. The wireless communications system of System Embodiment 9, further comprising: said second CPE device including a second processor; and wherein said second processor controls the second CPE device to monitor the ACK and NACK messages received from the wireless base station in response to data transmission attempts using the first set of resource blocks and adjust the frequency of data transmission attempts using the first set of resource blocks to minimize collisions with data transmission from the first CPE device using the first set of resource blocks.

System Embodiment 14. The wireless communications system of System Embodiment 1, wherein said wireless base station is a Citizens Broadband Radio Service Device; and wherein said customer premises equipment device is a Citizens Broadband Radio Service customer premises equipment device.

System Embodiment 15. The wireless communications system of System Embodiment 1, wherein said individual customer premises equipment devices provides services to one or more user equipment devices.

System Embodiment 16. The wireless communications system of System Embodiment 1, wherein said first processor further controls the wireless base station to perform the following operation: generating from information obtained over the first period of time, by the wireless base station, a customer premises equipment device profile for each of the individual customer premises equipment devices connected to the wireless base station, each of said customer premises equipment device profiles including a customer premises equipment device identifier which identifies the customer premises equipment device to which the customer premises equipment device profile corresponds, the resource grants to the CPE device, and the utilization of the CPE device resource grants during the first period of time.

NUMBERED LIST OF EXEMPLARY NON-TRANSITORY COMPUTER READABLE MEDIUM EMBODIMENTS

Non-Transitory Computer Readable Medium Embodiment 1.

A non-transitory computer readable medium including a first set of computer executable instructions which when executed by a processor of a wireless base station cause the wireless base station to perform the steps of: communicating resource grants to individual customer premise equipment (CPE) devices, said resource grants including at least a first resource grant to a first CPE device and a second resource grant to a second CPE device, the first resource grant giving the first CPE device the right to use a first set of resource blocks on a recurring basis, said second resource grant giving the second CPE device the right to use a second set of resource blocks on a recurring basis; monitoring the use of resource blocks granted to the first and second CPE devices during a first period of time; storing first resource utilization information about the utilization of said first set of resource blocks by said first CPE device; and storing second resource utilization information about the utilization of the second set of resource blocks by said second CPE device.

Non-Transitory Computer Readable Medium Embodiment 2. The non-transitory computer readable medium of Non-Transitory Computer Readable Medium Embodiment 1, wherein said first set of computer executable instructions which when executed by said processor of a wireless base station further cause the wireless base station to perform the steps: making a resource sharing decision based on the stored first and second resource utilization information; and transmitting a third grant granting the second CPE device the right to use resources which are granted to another CPE device.

Non-Transitory Computer Readable Medium Embodiment 3. The non-transitory computer readable medium of Non-Transitory Computer Readable Medium Embodiment 2, wherein said third grant grants resources which are shared as part of said resource sharing decision based on no or low use of resources granted in said third grant during said first period of time.

Non-Transitory Computer Readable Medium Embodiment 3A. The non-transitory computer readable medium of Non-Transitory Computer Readable Medium Embodiment 2, wherein said low use of resources granted in said third grant during said first period of time includes the utilization of the resources in the third grant being less than a first threshold value.

The techniques of various embodiments may be implemented using software, hardware and/or a combination of software and hardware. Various embodiments are directed to apparatus, e.g., wireless base stations, user equipment devices, Wi-Fi Access Points, CPE devices, CBSDs, CBRS tower base stations, CBRS CPE devices, SAS devices, user devices, subscriber devices, servers, nodes and/or elements. Various embodiments are also directed to methods, e.g., method of controlling and/or operating wireless base stations, user equipment devices, Wi-Fi Access Points, CPE devices, CBSDs, CBRS tower base stations, CBRS CPE devices, SAS devices, user devices, subscriber devices, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, wireless base stations, user equipment devices, Wi-Fi Access Points, CPE devices, CBSDs, CBRS tower base stations, CBRS CPE devices, SAS devices, user devices, subscriber devices, servers, nodes and/or elements described herein are implemented using one or more components to perform the steps corresponding to one or more methods, for example, ranking, establishing connections, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., wireless base stations, user equipment devices, Wi-Fi Access Points, CPE devices, CBSDs, CBRS tower base stations, CBRS CPE devices, SAS devices, user devices, subscriber devices, servers, nodes and/or elements are configured to perform the steps of the methods described as being performed by the wireless base stations, user equipment devices, Wi-Fi Access Points, CPE devices, CBSDs, CBRS tower base stations, CBRS CPE devices, SAS devices, user devices, subscriber devices, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., wireless base stations, user equipment devices, Wi-Fi Access Points, CPE devices, CBSDs, CBRS tower base stations, CBRS CPE devices, SAS devices, user devices, subscriber devices, servers, nodes and/or elements, with a processor which includes a component corresponding to each of the steps of the various described methods performed by the device in which the processor is included. In some but not all embodiments a device, e.g., wireless base stations, user equipment devices, Wi-Fi Access Points, CPE devices, CBSDs, CBRS tower base stations, CBRS CPE devices, SAS devices, user devices, subscriber devices, servers, nodes and/or element, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a wireless base stations, user equipment devices, Wi-Fi Access Points, CPE devices, CBSDs, CBRS tower base stations, CBRS CPE devices, SAS devices, user devices, subscriber devices, servers, nodes and/or element. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a wireless base stations, user equipment devices, Wi-Fi Access Points, CPE devices, CBSDs, CBRS tower base stations, CBRS CPE devices, SAS devices, user devices, subscriber devices, servers, nodes and/or element or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first wireless device, the method comprising:
   receiving a first resource grant at the first wireless device from a wireless base station, said first resource grant giving the first wireless device the right to use a first set of resource blocks on a recurring basis;
   utilizing, by the first wireless device, a first amount of resource blocks in the first set of resource blocks during a first time period, said first resource grant being different than a second resource grant giving a second wireless device the right to use a second set of resource blocks on a recurring basis;

receiving a third resource grant at the first wireless device from the wireless base station, said third resource grant granting the first wireless device the right to use resources which are also granted to another wireless device; and wherein said third resource grant is determined by the wireless base station based on the first amount of resource blocks in the first set of resource blocks utilized by the first wireless device during the first time period and an amount of resource blocks utilized by said another wireless device during the first time period.

2. The method of operating the first wireless device of claim 1, wherein said another wireless device is said second wireless device;

wherein said third resource grant grants the first wireless device the right to use said second set of resource blocks on a recurring basis during a second time period;

wherein said first wireless device and said second wireless device both have the right to use the second set of resource blocks during the second time period; and wherein said first wireless device continues to have the right to use the first set of resource blocks during the second time period.

3. The method of operating the first wireless device of claim 2, further comprising:

utilizing, by the first wireless device, some but not every recurrence of the second set of resource blocks during the second time period to transmit data; and determining, by the first wireless device, which recurrences of the second set of resource blocks to use for transmitting data based on a randomly generated probability value or a prior receipt of a Negative Acknowledgment (NACK) message in response to a transmission of data using the second set of resource blocks.

4. The method of operating the first wireless device of claim 2, wherein the first set of resource blocks includes one or more resource blocks; and wherein the second set of resource blocks includes one or more resource blocks which are different from the resource blocks in said first set of resource blocks.

5. A wireless communications system comprising:

a first wireless device, said first wireless device including:
  a memory; and
  a first processor, said first processor controlling the first wireless device to perform the following operations:
    receiving a first resource grant at the first wireless device from a wireless base station, said first resource grant giving the first wireless device the right to use a first set of resource blocks on a recurring basis;
    utilizing, by the first wireless device, a first amount of resource blocks in the first set of resource blocks during a first time period, said first resource grant being different than a second resource grant giving a second wireless device the right to use a second set of resource blocks on a recurring basis;
    receiving a third resource grant at the first wireless device from the wireless base station, said third resource grant granting the first wireless device the right to use resources which are also granted to another wireless device; and
    wherein said third resource grant is determined by the wireless base station based on the first amount of resource blocks in the first set of resource blocks utilized by the first wireless device during the first time period and an amount of resource blocks utilized by said another wireless device during the first time period.

6. The wireless communications system of claim 5, wherein said another wireless device is said second wireless device;

wherein said third resource grant grants the first wireless device the right to use said second set of resource blocks on a recurring basis during a second time period;

wherein said first wireless device and said second wireless device both have the right to use the second set of resource blocks during the second time period; and wherein said first wireless device continues to have the right to use the first set of resource blocks during the second time period.

7. The wireless communications system of claim 6, wherein the first processor further controls the first wireless device to perform the following operations:

utilizing, by the first wireless device, some but not every recurrence of the second set of resource blocks during the second time period to transmit data; and determining, by the first wireless device, which recurrences of the second set of resource blocks to use for transmitting data based on a randomly generated probability value or a prior receipt of a Negative Acknowledgment (NACK) message in response to a transmission of data using the second set of resource blocks.

8. A method of operating a wireless base station, the method comprising:

communicating resource grants to individual wireless devices, said resource grants including at least a first resource grant to a first wireless device and a second resource grant to a second wireless device, the first resource grant giving the first wireless device the right to use a first set of resource blocks on a recurring basis, said second resource grant giving the second wireless device the right to use a second set of resource blocks on a recurring basis;

monitoring the use of resource blocks granted to the first and second wireless devices during a first period of time;

storing first resource utilization information about the utilization of said first set of resource blocks by said first wireless device; and storing second resource utilization information about the utilization of the second set of resource blocks by said second wireless device.

9. The method of claim 8, wherein the first set of resource blocks includes one or more resource blocks; and wherein the second set of resource blocks includes one or more resource blocks which are different from the resource blocks in said first set of resource blocks.

10. The method of claim 8, further comprising:

making a resource sharing decision based on the stored first and second resource utilization information; and transmitting a third resource grant granting the second wireless device the right to use resources which are granted to another wireless device.

11. The method of claim 10, wherein said third resource grant grants resources which are shared as part of said resource sharing decision based on no or low use of resources granted in said third resource grant during said first period of time.

12. The method of claim 11, wherein making said resource sharing decision based on the stored first and second resource utilization information includes determining which of said first and second wireless devices utilized the full amount of resources granted to the wireless device during the first period of time.

13. The method of claim 11, wherein said resource sharing decision is based on statistical analysis of usage of the first and second resource grants by the first wireless device and second wireless device.

14. The method of claim 8, wherein the resource grants to individual wireless devices are uplink data transmission resource grants.

15. The method of claim 11,
wherein said third resource grant includes granting the second wireless device the right to use said first set of resource blocks on a recurring basis during a second period of time; and
wherein said first wireless device and said second wireless device both have the right to use the first set of resource blocks during the second period of time; and
wherein said second wireless device continues to have the right to use the second set of resource blocks during the second period of time.

16. The method of claim 8,
wherein said wireless base station is a Citizens Broadband Radio Service Device; and
wherein said first wireless device is a Citizens Broadband Radio Service wireless device.

17. A wireless communications system comprising:
a wireless base station, said wireless base station including:
  memory; and
  a first processor, said first processor controlling the wireless base station to perform the following operations:
    communicating resource grants to individual wireless devices, said resource grants including at least a first resource grant to a first wireless device and a second resource grant to a second wireless device, the first resource grant giving the first wireless device the right to use a first set of resource blocks on a recurring basis, said second resource grant giving the second wireless device the right to use a second set of resource blocks on a recurring basis;
    monitoring the use of resource blocks granted to the first and second wireless devices during a first period of time;
    storing first resource utilization information about the utilization of said first set of resource blocks by said first wireless device in said memory; and
    storing second resource utilization information about the utilization of the second set of resource blocks by said second wireless device in said memory.

18. The wireless communications system of claim 17,
wherein the first set of resource blocks includes one or more resource blocks; and
wherein the second set of resource blocks includes one or more resource blocks which are different from the resource blocks in said first set of resource blocks.

19. The wireless communications system of claim 17, wherein said first processor further controls the wireless base station to perform the following operations:
making a resource sharing decision based on the stored first and second resource utilization information; and
transmitting a third resource grant granting the second wireless device the right to use resources which are granted to another wireless device.

20. The wireless communications system of claim 19, wherein said third resource grant grants resources which are shared as part of said resource sharing decision based on no or low use of resources granted in said third resource grant during said first period of time.

* * * * *